(12) United States Patent
Kuze et al.

(10) Patent No.: US 7,239,595 B2
(45) Date of Patent: Jul. 3, 2007

(54) SPHERICAL ABERRATION CORRECTION CONTROL DEVICE AND OPTICAL DISC APPARATUS

(75) Inventors: Yuuichi Kuze, Osaka (JP); Katsuya Watanabe, Nara (JP); Kenji Fujiune, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 594 days.

(21) Appl. No.: 10/752,810

(22) Filed: Jan. 7, 2004

(65) Prior Publication Data

US 2004/0151088 A1    Aug. 5, 2004

(30) Foreign Application Priority Data

Feb. 3, 2003  (JP) .............................. 2003-025597

(51) Int. Cl.
*G11B 7/00* (2006.01)

(52) U.S. Cl. .............................................. 369/112.01

(58) Field of Classification Search ............. 369/112.1, 369/112.01, 112.02, 112.22, 112.23, 112.24, 369/112.26

See application file for complete search history.

(56) References Cited

U.S. PATENT DOCUMENTS 6,738,332 B2 * 5/2004 Sato et al. ................ 369/53.28
6,898,168 B2 * 5/2005 Kimura et al. ......... 369/112.01
6,925,046 B2 * 8/2005 Kuwahara et al. ..... 369/112.24
7,006,411 B2 * 2/2006 Hirai ....................... 369/44.24

FOREIGN PATENT DOCUMENTS

JP     2002-157750       5/2002

* cited by examiner

*Primary Examiner*—Nabil Hindi
(74) *Attorney, Agent, or Firm*—Renner, Otto, Boisselle & Sklar, LLP.

(57) ABSTRACT

A spherical aberration correction control device for controlling a spherical aberration correction section for correcting a spherical aberration of an optical beam irradiating an optical disc. The spherical aberration correction control device includes a spherical aberration control signal generation section for generating a spherical aberration control signal; and an output section for outputting the spherical aberration control signal to the spherical aberration correction section. A correction amount by which the spherical aberration is corrected is changed by the spherical aberration correction section in accordance with components of the spherical aberration control signal. The spherical aberration control signal generation section generates the spherical aberration control signal such that a sum of correction amounts corresponding to the respective components of the spherical aberration control signal becomes substantially zero with respect to a target correction amount.

24 Claims, 33 Drawing Sheets

Optical beam

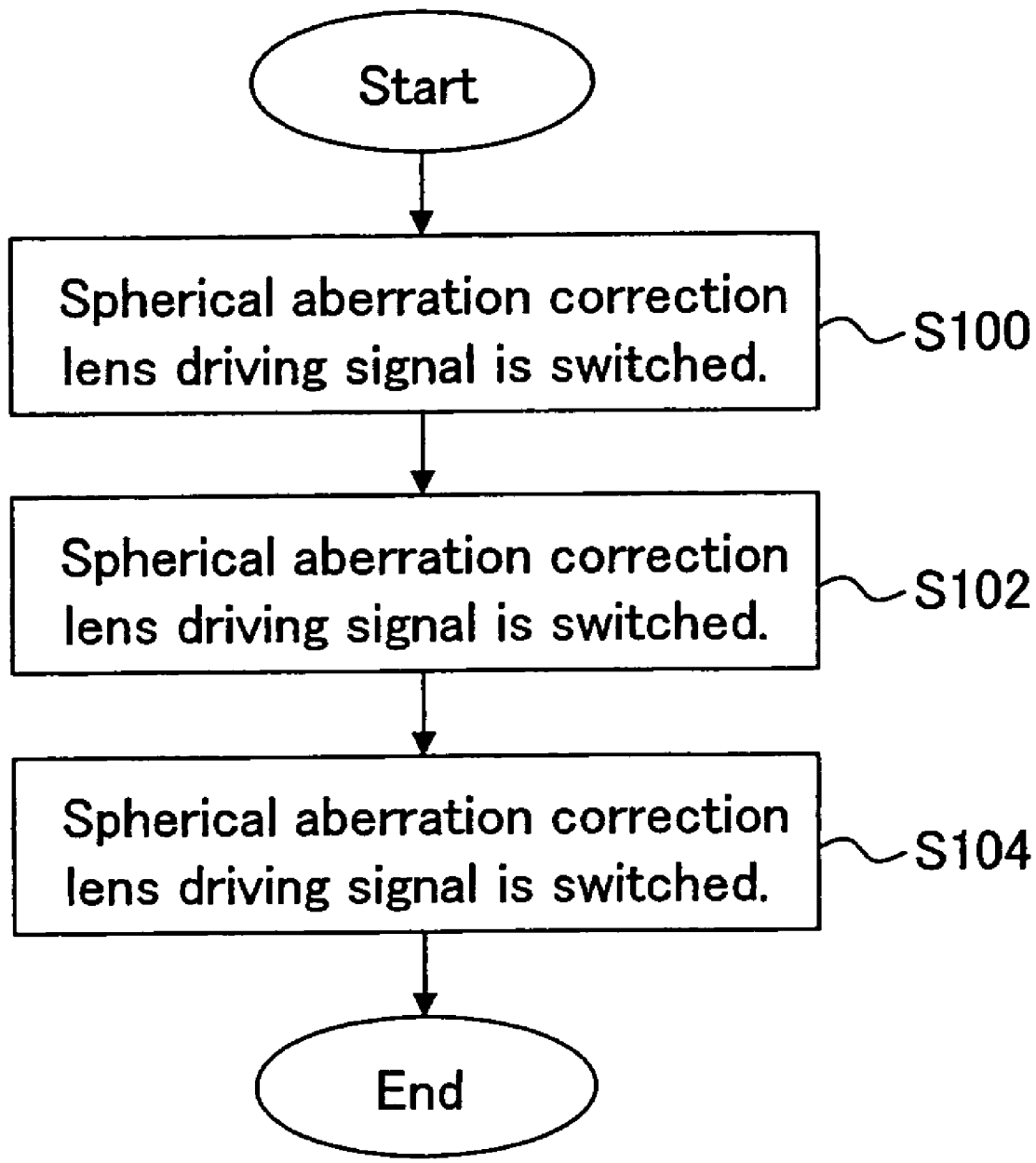

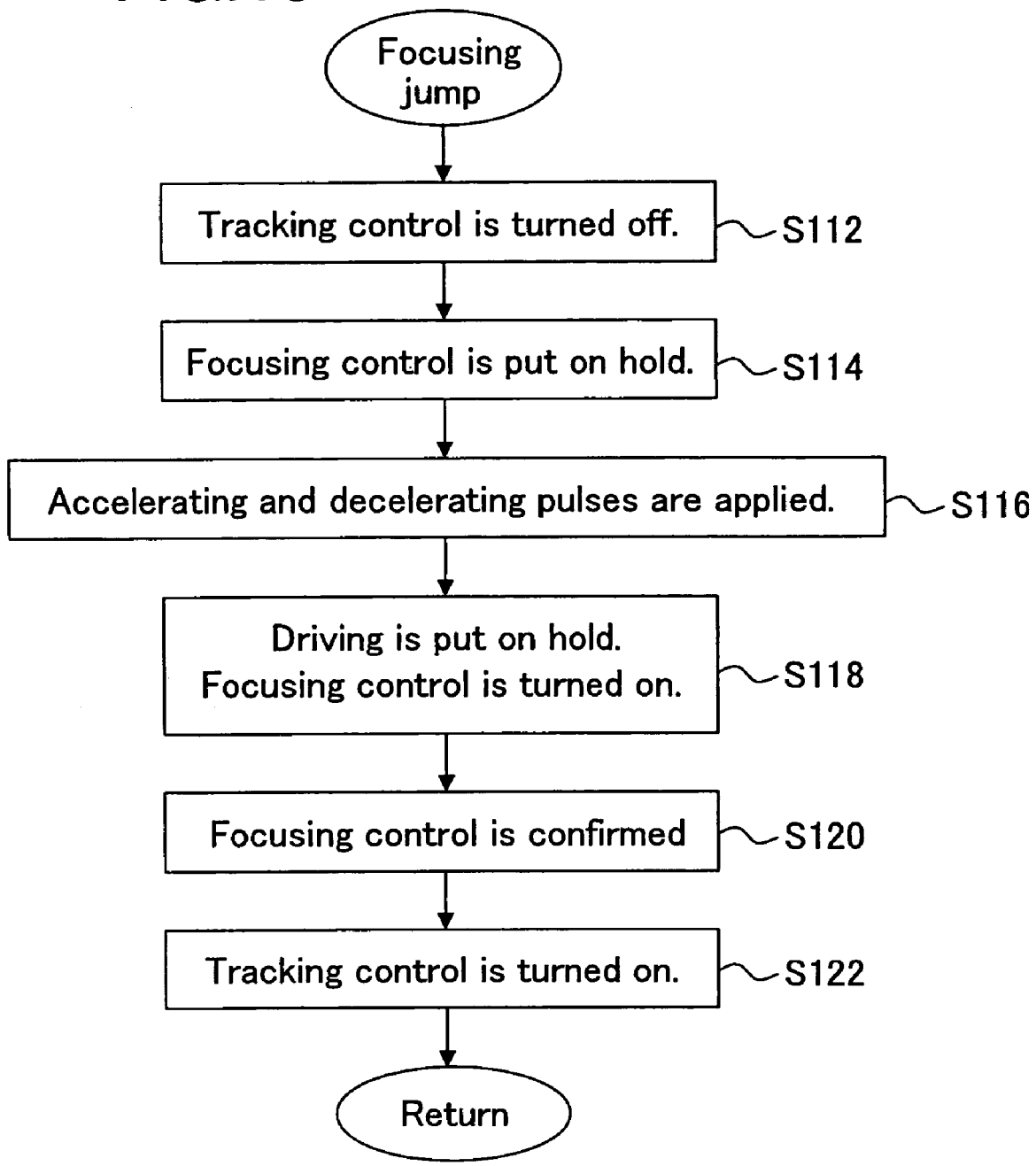

FIG.34A

Optical beam passing through the outer peripheral portion
Optical beam passing through the inner peripheral portion 122
126
126b
126a

FIG.34B

Optical beam passing through the inner peripheral portion
Optical beam passing through the outer peripheral portion 122
126
126b
126a

SPHERICAL ABERRATION CORRECTION CONTROL DEVICE AND OPTICAL DISC APPARATUS

BACKGROUND OF THE INVENTION

1. Field of the Invention

The present invention relates to a spherical aberration correction control device and an optical disc apparatus, and in particular to a spherical aberration correction control device for controlling a spherical aberration correction section for correcting a spherical aberration of an optical beam irradiating an optical disc, and an optical disc apparatus including the spherical aberration correction control device.

2. Description of the Related Art

Recently, optical discs such as DVD-ROM discs, DVD-RAM discs, DVD-RW discs, DVD-R discs and DVD+RW discs and DVD+R discs have been developed as high density, large capacity recording mediums.

An optical disc apparatus for recording information on such optical discs or reproducing information recorded on such optical discs generally uses an optical lens (objective lens) having a numerical aperture (NA) of 0.6. In order to realize a higher density and a larger capacity in recording information on or reproducing information from the optical discs, it has been proposed to use an optical lens having a numerical aperture of 0.8 or greater.

When using an optical lens having a numerical aperture of 0.8 or greater in an optical disc apparatus for accessing the data on an optical disc, generation of a spherical aberration cannot be ignored, which is not a problem when an optical disc having a numerical aperture of 0.6 is used. The spherical aberration is caused by a non-uniform thickness of a protective layer which protects an information face of the optical disc.

Currently, in order to eliminate the influence of the spherical aberration, the spherical aberration is corrected, or the correction amount of the spherical aberration is switched. Such correction of the spherical aberration and switching of the correction amount of the spherical aberration are especially effective when the optical disc has a plurality of information faces (see, for example, Japanese Laid-Open Publication No. 2002-157750, paragraphs 0070 through 0101 and FIGS. 1 through 8).

FIG. 33 is a timing diagram illustrating a conventional operation for switching the correction amount of the spherical aberration. Part (a) shows a time-wise change in a spherical aberration correction lens driving signal, and part (b) shows a time-wise change in a correction amount of the spherical aberration in consideration of the thickness of the protective layer. Part (c) shows a time-wise change in a moving speed of a spherical aberration correction lens, and part (d) shows a time-wise change in a moving acceleration of the spherical aberration correction lens.

In order to switch the correction amount of the spherical aberration to a target correction amount, the spherical aberration correction control device is conventionally operated as follows. As shown in part (a) of FIG. 33, the spherical aberration correction lens driving signal is switched in one step. As shown in part (b), the correction amount of the spherical aberration fluctuates with respect to the target correction amount when the spherical aberration correction lens driving signal is switched. In other words, the post-switching correction amount has a fluctuation component with respect to the target correction amount. The fluctuation component of the post-switching correction amount decreases in accordance with time, and as a result, the post-switching correction amount is converged to the target correction amount in a prescribed time period.

According to the conventional technique of correcting the spherical aberration, the correction amount of the spherical aberration is switched to a target correction amount as described above. The post-switching correction amount has a fluctuation component with respect to the target correction amount, and the fluctuation amount requires a prescribed time period to become zero. Therefore, it is time-consuming to switch the correction amount of the spherical aberration to a target correction amount.

The conventional technique does not consider the deviation in the correction amount of the spherical aberration. The correction amount of the spherical aberration deviates, for example, when the manner of arrangement of the optical disc apparatus is changed, (e.g., when the optical disc apparatus which has been located vertically is located horizontally or vice versa), when a change in the temperature around the optical disc apparatus changes the wavelength of the laser or sensitivity of the control system, or when variance of the spherical aberration correction section occurs during mass production of the spherical aberration correction control device. In such cases, there is a problem in that the spherical aberration cannot be properly corrected.

SUMMARY OF THE INVENTION

According to one aspect of the invention, a spherical aberration correction control device for controlling a spherical aberration correction section for correcting a spherical aberration of an optical beam irradiating an optical disc is provided. The spherical aberration correction control device includes a spherical aberration control signal generation section for generating a spherical aberration control signal; and an output section for outputting the spherical aberration control signal to the spherical aberration correction section. A correction amount by which the spherical aberration is corrected is changed by the spherical aberration correction section in accordance with components of the spherical aberration control signal. The spherical aberration control signal generation section generates the spherical aberration control signal such that a sum of correction amounts corresponding to the respective components of the spherical aberration control signal becomes substantially zero with respect to a target correction amount.

In one embodiment of the invention, the spherical aberration control signal generation section switches the spherical aberration control signal in at least two stages.

In one embodiment of the invention, the spherical aberration correction control device further includes a parameter receiving section for receiving a parameter for switching the spherical aberration control signal. The spherical aberration control signal generation section switches the spherical aberration control signal based on the parameter.

In one embodiment of the invention, the spherical aberration correction control device further includes a receiving section for receiving a deviation amount of the spherical aberration; and a calibration section for calibrating the spherical aberration control signal based on the deviation amount of the spherical aberration received by the receiving section, before the output section outputs the spherical aberration control signal to the spherical aberration correction section.

In one embodiment of the invention, the spherical aberration control signal generation section switches the spherical aberration control signal in a pulsed manner.

In one embodiment of the invention, the spherical aberration control signal generation section switches the spherical aberration control signal with a pulse width which is sufficiently shorter than a cycle of primary resonance of the spherical aberration correction section.

In one embodiment of the invention, the spherical aberration correction section includes a spherical aberration correction lens for switching the correction amount by moving in accordance with the spherical aberration control signal; and the spherical aberration control signal generation section switches the spherical aberration control signal so as to move the spherical aberration correction lens in acceleration from a position of the spherical aberration correction lens corresponding to the correction amount before the spherical aberration control signal is switched toward a position of the spherical aberration correction lens corresponding to the target correction amount, then switches the spherical aberration control signal so as to move the accelerated spherical aberration correction lens in deceleration, and then switches the spherical aberration control signal so as to correspond to the target correction amount.

In one embodiment of the invention, the spherical aberration control signal generation section switches the spherical aberration control signal so as to fulfill:

$$a1 \cdot t1 + a2 \cdot t2 = 0 (t1 \leq T, t2 \leq T);$$

and $$L = |a1 \cdot t1 \cdot t1|/2 + |a2 \cdot t2 \cdot t2|/2$$

where:

T is a cycle of primary resonance of the spherical aberration correction lens;

a1 is an amount of change in an amplitude of the spherical aberration control signal corresponding to an average value of the acceleration when the spherical aberration correction lens is accelerated;

a2 is an amount of change in an amplitude of the spherical aberration control signal corresponding to an average value of the acceleration when the spherical aberration correction lens is decelerated;

t1 is an accelerating time of the spherical aberration correction lens;

t2 is a decelerating time of the spherical aberration correction lens; and

L is an amount of movement of the spherical aberration correction lens from the position of the spherical aberration correction lens corresponding to the correction amount before the correction amount is switched to the position of the spherical aberration correction lens corresponding to the target correction amount.

In one embodiment of the invention, the spherical aberration control signal generation section performs first step switching of switching the spherical aberration control signal in a stepped manner so as to correspond to a prescribed correction amount between the correction amount before the spherical aberration control signal is switched and the target correction amount, and then performs second step switching of switching the spherical aberration control signal in a stepped manner so as to correspond to the target correction amount.

In one embodiment of the invention, the spherical aberration control signal generation section sets the prescribed correction amount such that a maximum value of the correction amount in the first step switching is the target correction amount.

In one embodiment of the invention, the spherical aberration correction section includes a spherical aberration correction lens for switching the correction amount by moving in accordance with the spherical aberration control signal. The spherical aberration control signal generation section switches the spherical aberration control signal so as to fulfill:

$$A = (L/K1)/(1 + \exp(-\omega n \cdot \zeta \cdot t1)/\sqrt{1 - \zeta \cdot \zeta}))$$

$$B = L/K1$$

$$t1 = (3\pi/2 - \operatorname{atn}(\sqrt{1 - \zeta \cdot \zeta}/\zeta)/(\omega n \cdot \sqrt{1 - \zeta \cdot \zeta}))$$

where:

A is an amount of change in an amplitude of the spherical aberration control signal between the spherical aberration control signal before the first step switching and the spherical aberration control signal after the first step switching;

B is an amount of change in an amplitude of the spherical aberration control signal between the spherical aberration control signal before the first step switching and the spherical aberration control signal after the second step switching;

t1 is a time period from the first step switching to the second step switching;

L is an amount of movement of the spherical aberration correction lens from a position of the spherical aberration correction lens corresponding to the correction amount before the first step switching to a position of the spherical aberration correction lens corresponding to the target correction amount;

$\zeta$ is an attenuation coefficient of the spherical aberration correction lens ($\zeta < 1$);

$\omega n$ is a primary resonance angular frequency of the spherical aberration correction lens;

K1 is a sensitivity of the spherical aberration correction section;

exp( ) is an operation symbol of an index having Napier's number as the base;

sqrt( ) is an operation symbol of square root; and atn( ) is an operation symbol of arc tangent.

According to another aspect of the invention, an optical disc apparatus includes a spherical aberration correction section for correcting a spherical aberration of an optical beam irradiating an optical disc; and a spherical aberration correction control section for controlling the spherical aberration correction section. The spherical aberration correction control section includes a spherical aberration control signal generation section for generating a spherical aberration control signal; and an output section for outputting the spherical aberration control signal to the spherical aberration correction section. A correction amount by which the spherical aberration is corrected is changed by the spherical aberration correction section in accordance with components of the spherical aberration control signal. The spherical aberration control signal generation section generates the spherical aberration control signal such that a sum of correction amounts corresponding to the respective components of the spherical aberration control signal becomes substantially zero with respect to a target correction amount.

In one embodiment of the invention, the spherical aberration control signal generation section switches the spherical aberration control signal in at least two stages.

In one embodiment of the invention, the optical disc apparatus further includes a parameter receiving section for receiving a parameter for switching the spherical aberration control signal. The spherical aberration control signal generation section switches the spherical aberration control signal based on the parameter.

In one embodiment of the invention, the optical disc has at least one information face. The at least one information face includes a first information face. The optical disc apparatus further includes a convergence section for converging the optical beam to the first information face; a vertical moving section for moving the converging section in a direction substantially perpendicular to the first information face; a focusing error detection section for detecting a convergence state of the optical beam converged to the first information face; and a focusing control section for controlling the vertical moving section so as to converge the optical beam to the first information face based on the convergence state of the optical beam detected by the focusing error detection section.

In one embodiment of the invention, the at least one information face further includes a second information face. The optical disc apparatus further includes an information face movement control section for controlling the vertical moving section such that the optical beam converged on the first information face moves to the second information face. The spherical aberration correction control section controls the spherical aberration correction section so as to switch the correction amount to a correction amount corresponding to the second information face.

In one embodiment of the invention, the spherical aberration control signal generation section further includes a receiving section for receiving a deviation amount of the spherical aberration; and a calibration section for calibrating the spherical aberration control signal based on the deviation amount of the spherical aberration received by the receiving section, before the output section outputs the spherical aberration control signal to the spherical aberration correction section.

In one embodiment of the invention, the spherical aberration control signal generation section switches the spherical aberration control signal in a pulsed manner.

In one embodiment of the invention, the spherical aberration control signal generation section switches the spherical aberration control signal with a pulse width which is sufficiently shorter than a cycle of primary resonance of the spherical aberration correction section.

In one embodiment of the invention, the spherical aberration correction section includes a spherical aberration correction lens for switching the correction amount by moving in accordance with the spherical aberration control signal. The spherical aberration control signal generation section switches the spherical aberration control signal so as to move the spherical aberration correction lens in acceleration from a position of the spherical aberration correction lens corresponding to the correction amount before the spherical aberration control signal is switched toward a position of the spherical aberration correction lens corresponding to the target correction amount, then switches the spherical aberration control signal so as to move the accelerated spherical aberration correction lens in deceleration, and then switches the spherical aberration control signal so as to correspond to the target correction amount.

In one embodiment of the invention, the spherical aberration control signal generation section switches the spherical aberration control signal so as to fulfill:

$a1 \cdot t1 + a2 \cdot t2 = 0 (t1 \leq T, t2 \leq T);$ and $L = |a1 \cdot t1 \cdot t1|/2 + |a2 \cdot t2 \cdot t2|/2$ where:

T is a cycle of primary resonance of the spherical aberration correction lens;

a1 is an amount of change in an amplitude of the spherical aberration control signal corresponding to an average value of the acceleration when the spherical aberration correction lens is accelerated;

a2 is an amount of change in an amplitude of the spherical aberration control signal corresponding to an average value of the acceleration when the spherical aberration correction lens is decelerated;

t1 is an accelerating time of the spherical aberration correction lens;

t2 is a decelerating time of the spherical aberration correction lens; and

L is an amount of movement of the spherical aberration correction lens from the position of the spherical aberration correction lens corresponding to the correction amount before the correction amount is switched to the position of the spherical aberration correction lens corresponding to the target correction amount.

In one embodiment of the invention, the spherical aberration control signal generation section performs first step switching of switching the spherical aberration control signal in a stepped manner so as to correspond to a prescribed correction amount between the correction amount before the spherical aberration control signal is switched and the target correction amount, and then performs second step switching of switching the spherical aberration control signal in a stepped manner so as to correspond to the target correction amount.

In one embodiment of the invention, the spherical aberration control signal generation section sets the prescribed correction amount such that a maximum value of the correction amount in the first step switching is the target correction amount.

In one embodiment of the invention, the spherical aberration correction section includes a spherical aberration correction lens for switching the correction amount by moving in accordance with the spherical aberration control signal. The spherical aberration control signal generation section switches the spherical aberration control signal so as to fulfill:

$A = (L/K1)/(1 + \exp(-\omega n \cdot \zeta \cdot t1)/\sqrt{1 - \zeta \cdot \zeta})$ $B = L/K1$ $t1 = (3\pi/2 - \operatorname{atn}(\sqrt{1-\zeta \cdot \zeta}/\zeta))/(\omega n \cdot \sqrt{1-\zeta \cdot \zeta})$ where:

A is an amount of change in an amplitude of the spherical aberration control signal between the spherical aberration control signal before the first step switching and the spherical aberration control signal after the first step switching;

B is an amount of change in an amplitude of the spherical aberration control signal between the spherical aberration control signal before the first step switching and the spherical aberration control signal after the second step switching;

t1 is a time period from the first step switching to the second step switching;

L is an amount of movement of the spherical aberration correction lens from a position of the spherical aberration correction lens corresponding to the correction amount before the first step switching to a position of the spherical aberration correction lens corresponding to the target correction amount;

ζ is an attenuation coefficient of the spherical aberration correction lens (ζ<1);

ωn is a primary resonance angular frequency of the spherical aberration correction lens;

K1 is a sensitivity of the spherical aberration correction section;

exp( ) is an operation symbol of an index having Napier's number as the base;

sqrt( ) is an operation symbol of square root; and atn( ) is an operation symbol of arc tangent.

According to still another aspect of the invention, a spherical aberration correction control device for controlling a spherical aberration correction section for correcting a spherical aberration of an optical beam irradiating an optical disc is provided. The spherical aberration correction control device includes a spherical aberration control signal generation section for generating a spherical aberration control signal; a receiving section for receiving a deviation amount of the spherical aberration; a calibration section for calibrating the spherical aberration control signal based on the deviation amount of the spherical aberration received by the receiving section; and an output section for outputting the spherical aberration control signal calibrated by the calibration section.

In one embodiment of the invention, the optical disc includes at least two information faces.

According to still another aspect of the invention, an optical disc apparatus includes a spherical aberration correction section for correcting a spherical aberration of an optical beam irradiating an optical disc; a spherical aberration correction control section for controlling the spherical aberration correction section; and a detection section for detecting a deviation amount of the spherical aberration. The spherical aberration correction control section includes a spherical aberration control signal generation section for generating a spherical aberration control signal; a receiving section for receiving the deviation amount of the spherical aberration; a calibration section for calibrating the spherical aberration control signal based on the deviation amount of the spherical aberration received by the receiving section; and an output section for outputting the spherical aberration control signal calibrated by the calibration section.

In one embodiment of the invention, the optical disc includes at least one information face. The at least one information face includes a first information face. The optical disc apparatus further includes a convergence section for converging the optical beam to the first information face; a vertical moving section for moving the converging section in a direction substantially perpendicular to the first information face; a focusing error detection section for detecting a convergence state of the optical beam converged to the first information face; and a focusing control section for controlling the vertical moving section so as to converge the optical beam to the first information face based on the convergence state of the optical beam detected by the focusing error detection section.

In one embodiment of the invention, the at least one information face further includes a second information face. The optical disc apparatus further includes an information face movement control section for controlling the vertical moving section such that the optical beam converged on the first information face moves to the second information face. The spherical aberration correction control section controls the spherical aberration correction section so as to switch the correction amount to a correction amount corresponding to the second information face.

In one embodiment of the invention, the detection section detects the deviation amount of the spherical aberration based on jitter between a reproduction signal reproduced from the optical disc and a reproduction signal reference clock signal.

In one embodiment of the invention, the detection section detects the deviation amount of the spherical aberration based on a tracking error signal for the optical disc.

In one embodiment of the invention, the detection section detects the deviation amount of the spherical aberration based on an error rate of data read from the optical disc.

Thus, the invention described herein makes possible the advantages of quickly switching the correction amount of the spherical aberration to a target correction amount and properly correcting the spherical aberration.

These and other advantages of the present invention will become apparent to those skilled in the art upon reading and understanding the following detailed description with reference to the accompanying figures.

BRIEF DESCRIPTION OF THE DRAWINGS

FIG. 9 is a flowchart of an operation for switching the correction amount of the spherical aberration according to the first example;

FIG. 10 is a flowchart of focusing jump processing according to the first example;

FIGS. 34A and 34B are each a schematic view illustrating the spherical aberration of the optical beam according to the first example of the present invention.

DESCRIPTION OF THE PREFERRED EMBODIMENTS

Hereinafter, the present invention will be described by way of illustrative examples with reference to the accompanying drawings.

EXAMPLE 1

Figure 1:
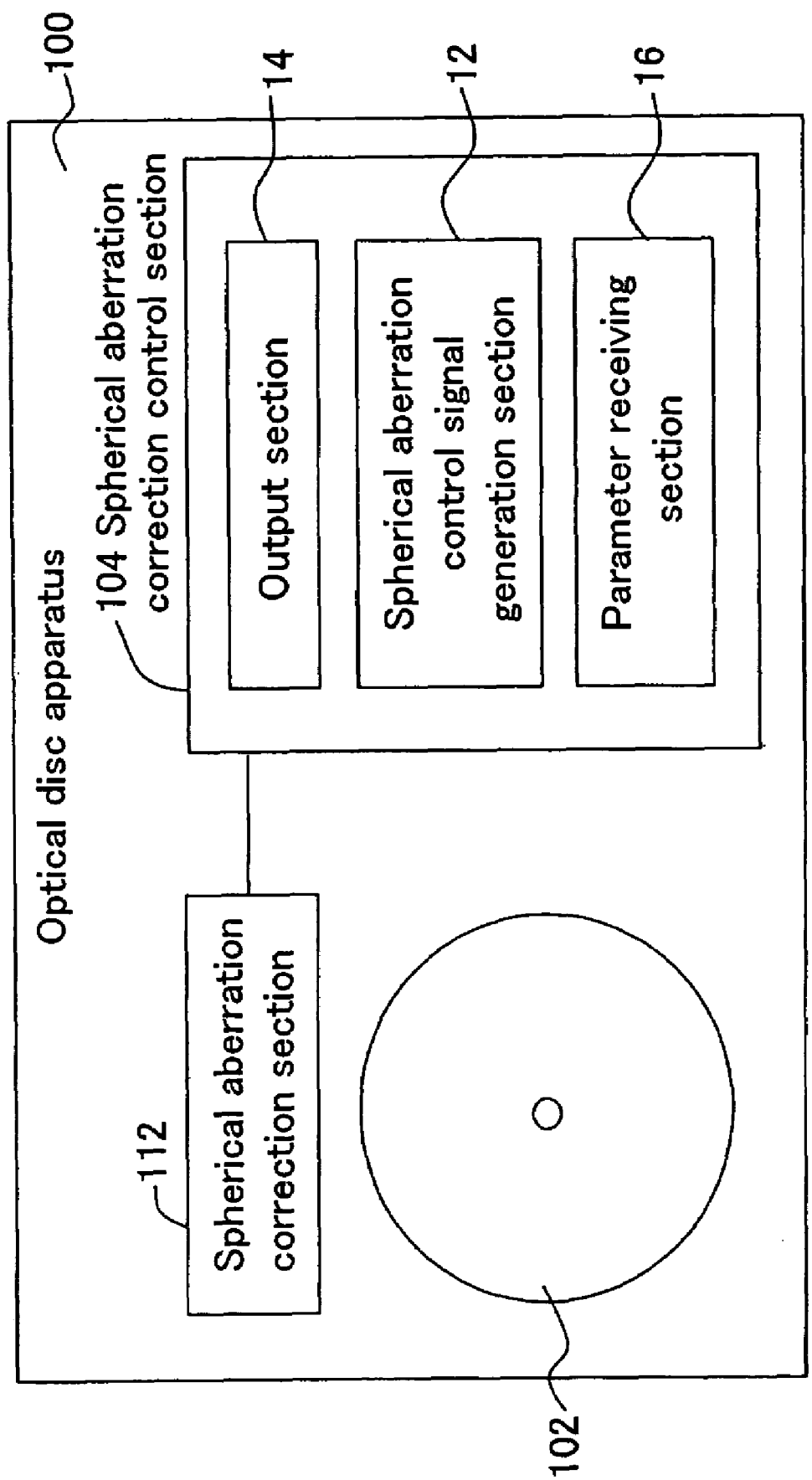
FIG. 1 is a schematic view of an optical disc apparatus according to a first example of the present invention.

FIG. 1 is a schematic view of an optical disc apparatus 100 according to a first example of the present invention.

The optical disc apparatus 100 includes a spherical aberration correction section 112 for correcting a spherical aberration of an optical beam irradiating an optical disc 102, and a spherical aberration correction control section 104 for controlling the spherical aberration correction section 112.

The spherical aberration correction control section 104 includes a spherical aberration control signal generation section 12 for generating a spherical aberration control signal and an output section 14 for outputting the spherical aberration control signal to the spherical aberration correction section 112.

A correction amount of the spherical aberration is changed by the spherical aberration correction section 112 in accordance with components of the spherical aberration control signal.

The spherical aberration control signal generation section 12 generates a spherical aberration control signal such that the sum of correction amounts corresponding to the components of the spherical aberration control signal is substantially zero with respect to a target correction amount.

The spherical aberration correction control section 104 may further include a parameter receiving section 16 for receiving parameters for switching the spherical aberration control signal. In such a case, the spherical aberration control signal generation section 12 generates a spherical aberration control signal based on the parameters received by the parameter receiving section 16.

The spherical aberration correction control section 104 controls the spherical aberration correction section 112 so as to switch the correction amount of the spherical aberration of the optical beam irradiating the optical disc 102 to a target correction amount.

The optical disc 102 is a recording medium which is accessible by the optical beam.

The optical disc 102 may be a disc including two, or three or more stacked layers of DVD-ROM, DVD-RAM, DVD-RW, DVD-R, DVD+RW or DVD+R. The optical disc 102 may be a high density optical disc using a wavelength of blue light or shorter.

The optical disc 102 has at least one information face. An embodiment in which the optical disc 102 has one information face will be described in detail in a fourth example of the present invention. In the first example, the optical disc 102 has at least two information faces.

When the optical disc 102 has at least two information faces, the spherical aberration correction control section 104 switches the correction amount, for example, when performing a focusing jump (inter-layer jump) of moving the optical beam spot from one information face to another information face or when the correction amount of the spherical aberration is calibrated.

The spherical aberration correction control section 104 controls the spherical aberration correction section 112 so as to switch the correction amount of the spherical aberration to a target correction amount by, for example, switching a spherical aberration control signal for controlling the correction amount of the spherical aberration in at least two stages.

Figure 2:
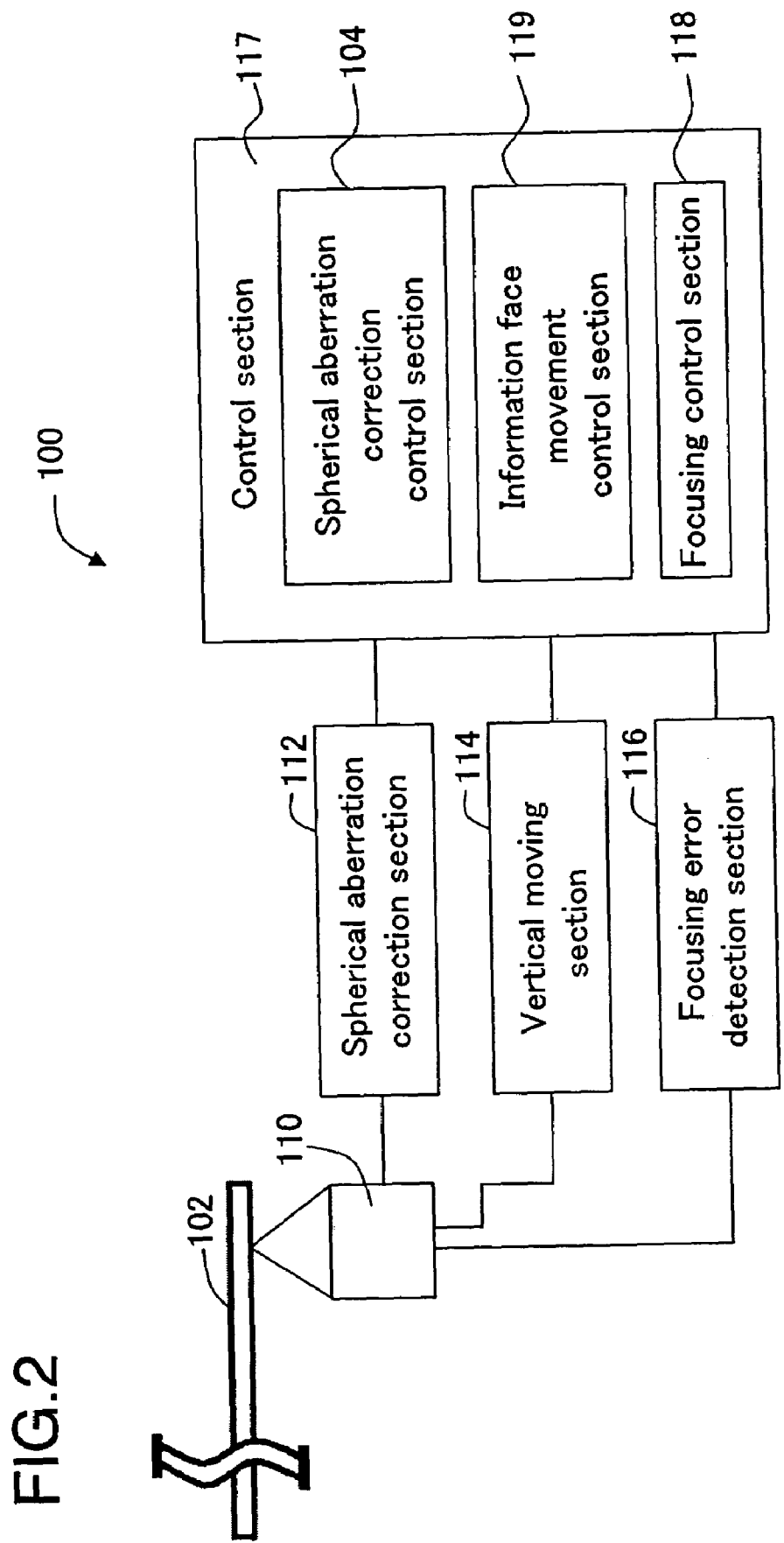
FIG. 2 is a schematic view illustrating a general functional structure of the optical disc apparatus shown in FIG. 1.

FIG. 2 is a schematic view illustrating a general functional structure of the optical disc apparatus 100 shown in FIG. 1.

The optical disc apparatus 100 includes a converging section 110, a spherical aberration correction section 112, a vertical moving section 114, a focusing error detection section 116, and a control section 117.

The control section 117 includes a spherical aberration correction control section 104, an information face movement control section 119, and a focusing control section 118.

The converging section 110 converges the optical beam to a target information face of the optical disc 102. The converging section 110 includes, for example, an optical lens (objective lens). The optical lens (objective lens) may be, for example, an optical lens having a numerical aperture of 0.6 or greater or an optical lens having a numerical aperture of 0.8 or greater.

The vertical moving section 114 moves the converging section 110 in a direction substantially perpendicular to the prescribed information face. The vertical moving section 114 includes, for example, an actuator using a coil and a magnet.

The focusing error detection section 116 generates a signal representing the convergence state of the optical beam on the information face. The focusing error detection section 116 generates, for example, an error signal representing an error of the optical beam spot with respect to the direction perpendicular to the optical disc 102.

The spherical aberration correction section 112 corrects a spherical aberration of an optical beam irradiating the information face of the optical disc 102.

The control section 117 receives a signal output from the focusing error detection section 116 and controls the spherical aberration correction section 112 and the vertical moving section 114 based on the signal output from the focusing error detection section 116.

In detail, the focusing control section 118 controls the vertical moving section 114 so as to converge the optical beam on the information face based on the signal output from the focusing error detection section 116.

The information face movement control section 119 controls the vertical moving section 114 so as to move the optical beam spot converged on an information face of the optical disc 102 to a target information face which is different from the information face on which the optical beam is currently directed. For example, the information face movement control section 119 controls the vertical moving section 114 so as to move the optical beam spot (i.e., so as to perform focusing jump) by bang-bang control.

Here, the spherical aberration correction control section 104 is shown as one element of the optical disc apparatus 100, but the spherical aberration correction control section 104 acts as a spherical aberration correction control device for controlling the spherical aberration correction section 112 for correcting a spherical aberration even when not included in the optical disc apparatus 100.

Figure 3:
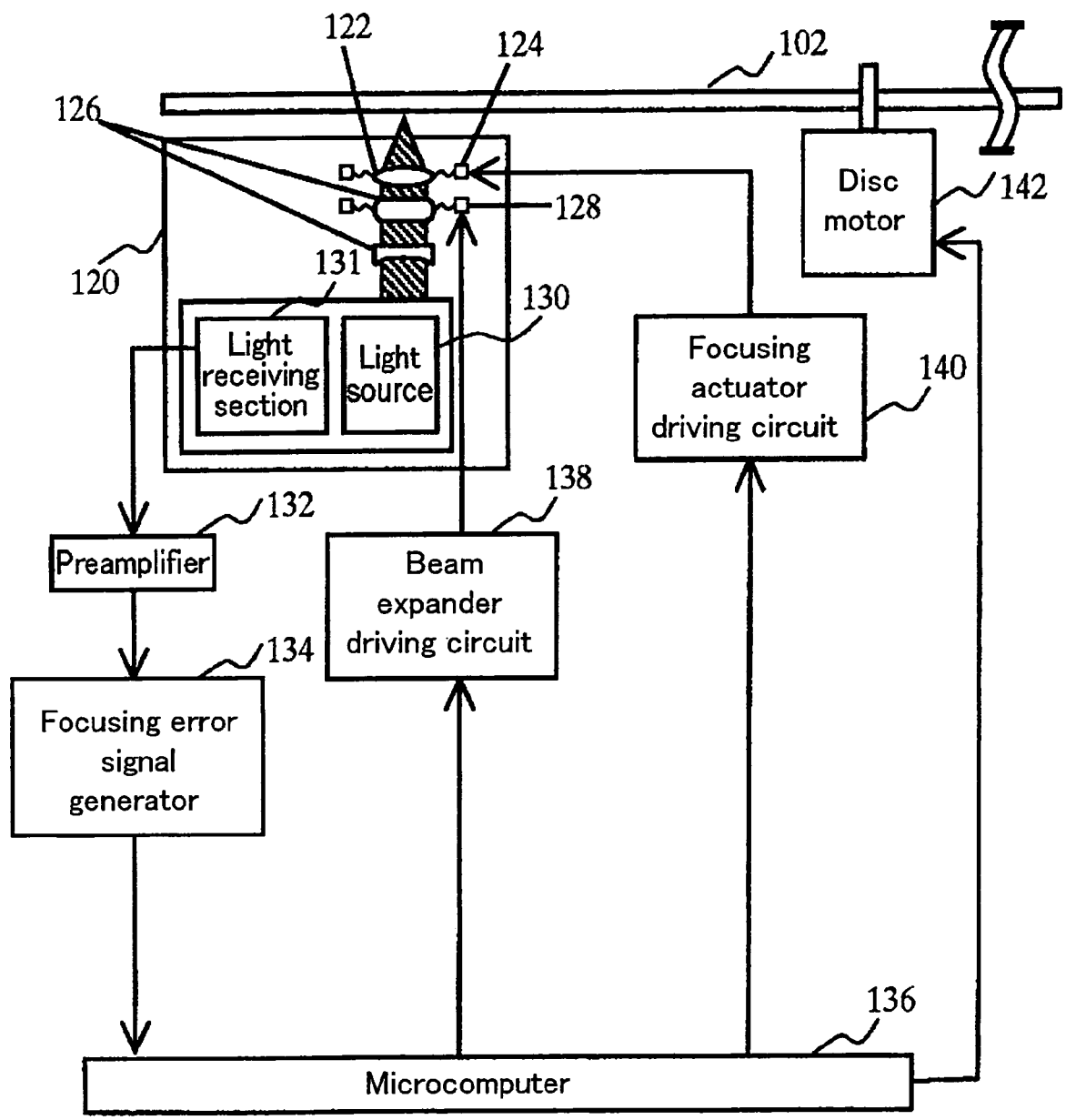
FIG. 3 is a schematic view illustrating an example of a hardware structure of the optical disc apparatus shown in FIG. 2.

FIG. 3 is a schematic view illustrating an example of a hardware structure of the optical disc apparatus 100 shown in FIG. 2.

The optical disc apparatus 100 include an optical head device 120, a preamplifier 132, a focusing error signal generator 134, a microcomputer 136, a beam expander driving circuit 138, a focusing actuator driving circuit 140, and a disc motor 142.

The optical head device 120 includes an objective lens 122, a focusing actuator 124, a spherical aberration correction lens 126, a spherical aberration correction actuator 128, a light source 130 and a light receiving section 131.

The elements of the optical disc apparatus 100 shown in FIG. 2 and the elements of the optical disc apparatus 100 shown in FIG. 3 have the following relationship.

The objective lens 122 shown in FIG. 3 corresponds to the converging section 110 shown in FIG. 2.

The light receiving section 131, the preamplifier 132, and the focusing error signal generator 134 shown in FIG. 3 correspond to the focusing error detection section 116 shown in FIG. 2.

The focusing actuator driving circuit 140 and the focusing actuator 124 shown in FIG. 3 correspond to the vertical moving section 114 shown in FIG. 2.

The spherical aberration correction lens 126, the spherical aberration correction actuator 128, and the beam expander driving circuit 138 shown in FIG. 3 correspond to the spherical aberration correction section 112 shown in FIG. 2.

The microcomputer 136 shown in FIG. 3 is an embodiment of the control section 117 shown in FIG. 2.

Hereinafter, the optical disc apparatus 100 shown in FIG. 3 will be described.

The disc motor 142 rotates the optical disc 102 at a prescribed rotation number (rotation rate).

The microcomputer 136 controls the beam expander driving circuit 138 and the discmotor 142. The microcomputer 136 performs a filter calculation such as phase compensation, gain compensation or the like on a focusing error signal (FE signal) from the focusing error signal generator 134. Then, the microcomputer 136 outputs a control signal to the focusing actuator driving circuit 140. Instead of the microcomputer 136, a DSP (digital signal processor) may be used.

The light source 130 of the optical head device 120 outputs an optical beam and forms an optical beam spot on an information face of the optical disc 102. The light receiving section 131 of the optical head device 120 receives the light reflected by the optical disc 102 and outputs an current signal in accordance with the reflected light.

The preamplifier 132 converts the current signal from the light receiving section 131 of the optical head device 120 to a voltage signal. The focusing error signal generator 134 receives the voltage signal from the preamplifier 132 and outputs an FE signal. The FE signal is a signal representing a convergence state of the optical beam on the information face of the optical disc 102. The microcomputer 136 uses the FE signal to control the focusing actuator driving circuit 140 such that the convergence state of the optical beam becomes a prescribed convergence state.

The method for detecting an FE signal is not specifically limited. In order to detect an FE signal, an astigmatism method or knife edge method may be used. An SSD (spot sized detection) method may be used, In accordance with the method for detecting the FE signal, the circuit configuration may be properly changed.

The microcomputer 136 performs a filter calculation such as phase compensation, gain compensation or the like on an FE signal from the focusing error signal generator 134. Then, the microcomputer 136 outputs the result to the focusing actuator driving circuit 140 as a control signal. The microcomputer 136 outputs a control signal to the beam expander driving circuit 138.

The focusing actuator driving circuit 140 drives the focusing actuator 124 of the optical head device 120 based on the control signal from the microcomputer 136.

The beam expander driving circuit 138 drives the spherical aberration correction actuator 128 of the optical head device 120 based on the control signal from the microcomputer 136.

Hereinafter, the optical head device 120 will be described in more detail.

The light source 130 outputs an optical beam. The light source 130 is, for example, a semiconductor laser or the like. The light source 130 may output an optical beam having a wavelength of 680 nm or shorter, or may output an optical beam having a wavelength of 420 nm or shorter.

The objective lens 122 converges the light beam which is output from the light source 130 and forms an optical beam spot on an information face of the optical disc 102. The objective lens 122 allows the light reflected by the information face of the optical disc 102 to pass therethrough.

The light receiving section 131 receives the light reflected by the optical disc 102 which has passed through the objective lens 122, and generates an electric signal (current signal) in accordance with the light. The light receiving section 131 is, for example, divided into four.

The focusing actuator 124 moves the objective lens 122 in a direction substantially perpendicular to the information face of the optical disc 102.

The spherical aberration correction lens 126 is located between the light source 130 and the objective lens 122. The spherical aberration correction lens 126 allows the light beam from the light source 130 to pass therethrough and changes the spherical aberration generated in the optical beam spot.

Figure 4:
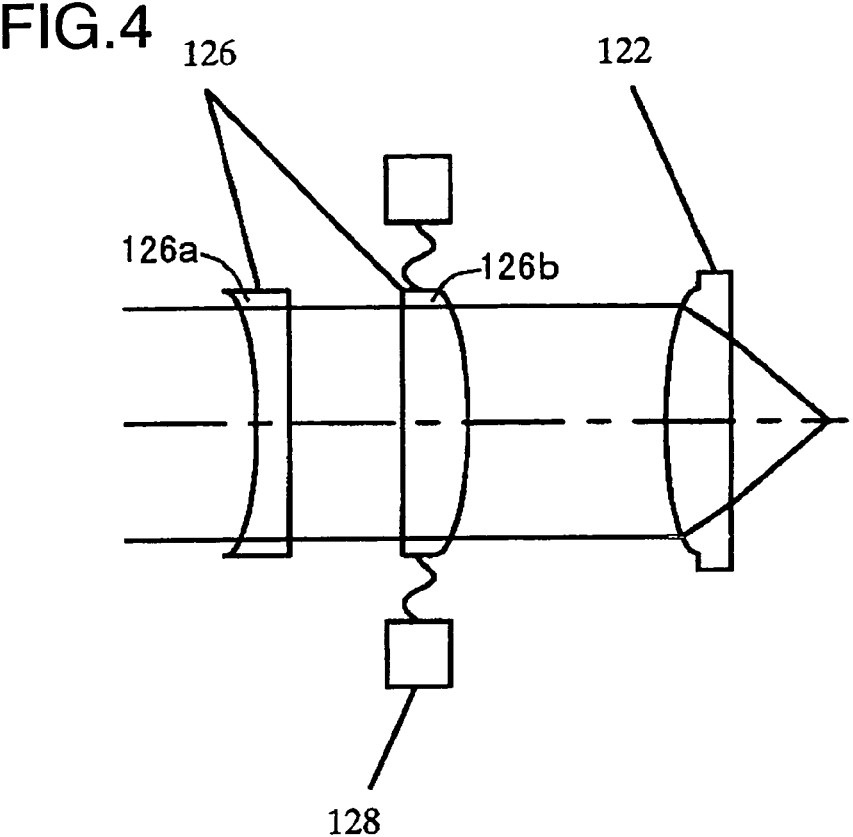
FIG. 4 is a schematic view of a spherical aberration correction lens according to the first example.

FIG. 4 is a schematic view of the spherical aberration correction lens 126 according to the first example.

The spherical aberration correction lens 126 includes a concave lens member 126a and a convex lens member 126b. In the spherical aberration correction lens 126, the concave lens member 126a and/or the convex lens member 126b includes, for example, a leaf spring, and is held in a movable state by an elastic member such as the spring or the like.

The spherical aberration correction actuator 128 moves at least one of the lens members of the spherical aberration correction lens 126 so as to change the distance between the concave lens member 126a and the convex lens member 126b, and thus changes the spherical aberration of the optical beam.

Figure 5:
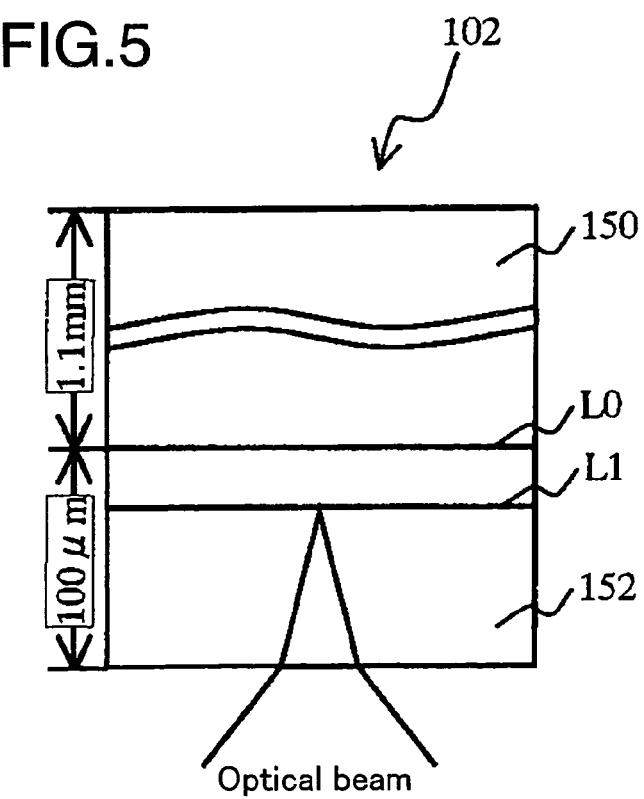
FIG. 5 is a schematic view illustrating an example of an optical disc according to the first example.

FIG. 5 is a schematic view illustrating an example of the optical disc 102.

The optical disc 102 includes a substrate 150, a first information face L0, a second information face L1, and a protective layer 152.

The optical disc 102 is structured such that access is possible from one of two outer faces to the first information face L0 and the second information face L1. The protective layer 152 allows the optical beam to pass therethrough.

In one embodiment, the optical disc 102 has a thickness of 1.2 mm and the substrate 150 has a thickness of about 1.1 mm. The first information face L0 and the second information face L1 are located to be distanced from each other by about 25 µm. The first information face L0 is located at a position 100±5 µm away from a surface of the protective layer 152. The second information face L1 is located at a position 75±5 µm away from a surface of the protective layer 152.

Figure 6:
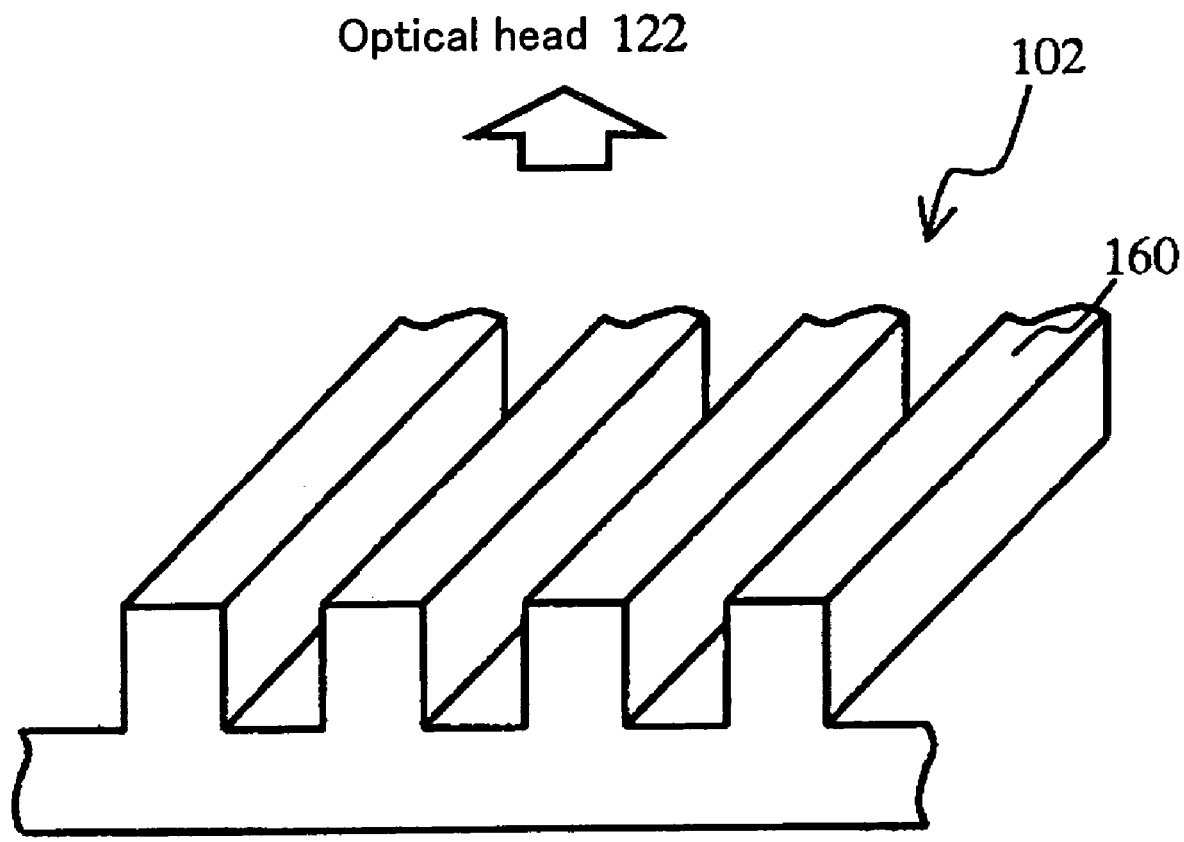
FIG. 6 is a schematic isometric view illustrating a structure of a track of the optical disc according to the first example.

FIG. 6 is a schematic isometric view illustrating a structure of a track of the optical disc 102 according to the first example.

On the first information face L0 of the optical disc 102, a plurality of convex tracks 160 are formed. Thus, the first information face L0 is convexed and concaved.

FIG. 6 shows that the track is formed on the first information face L0. A track is also formed on the second information face L1.

The track may be spiral or circular.

The optical head device 120 directs an optical beam toward the first information face L0 and the second information face L1 from the side to which the convex tracks 160 are projected, so as to record or reproduce information. The structure of the optical disc 102 is not limited to the above and may be, for example, a pit structure.

With reference to FIGS. 7 through 14, 34A, 34B, 35A and 35B, an operation of the optical disc apparatus 100 having the above-described structure will be described.

Figure 7:
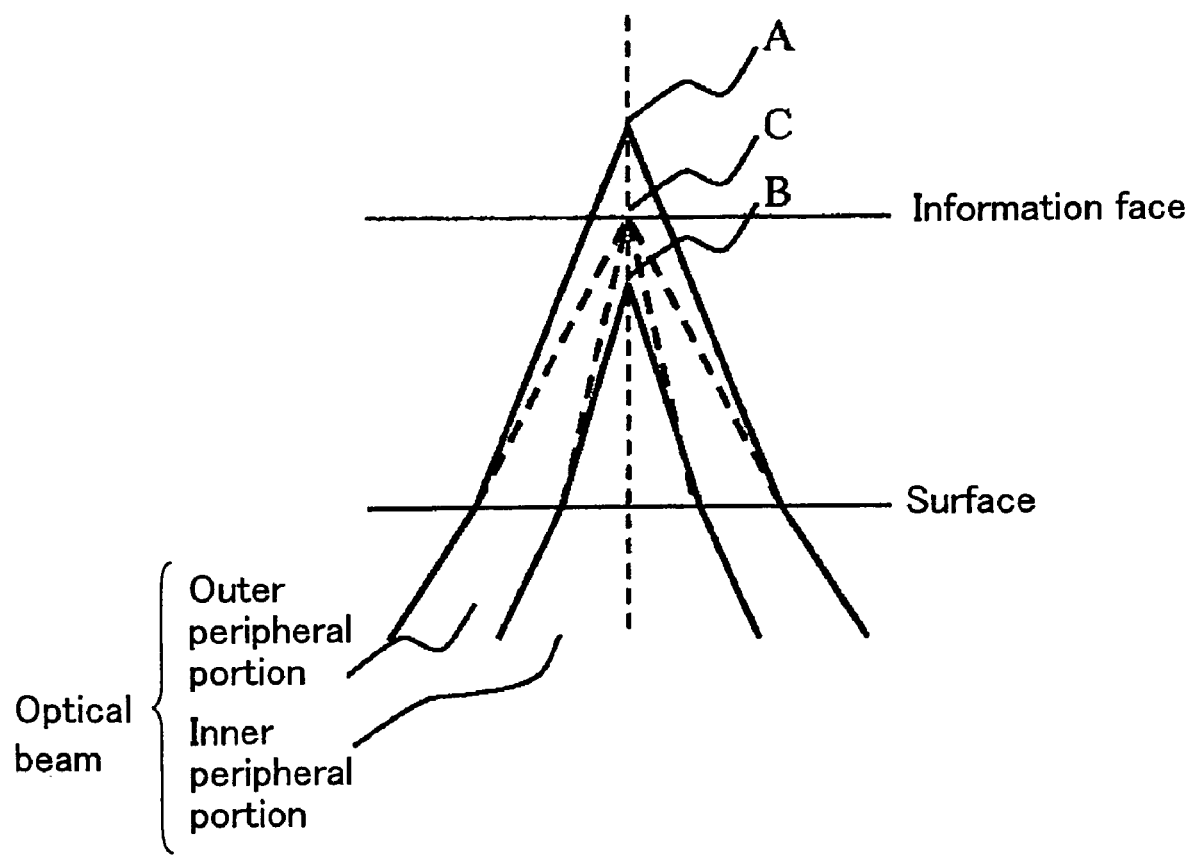
FIG. 7 is a schematic diagram illustrating the spherical aberration of an optical beam according to the first example.

FIG. 7 is a schematic diagram illustrating the spherical aberration of an optical beam.

In the state where the focusing control is being performed, the optical head device 120 outputs an optical beam. The optical beam which is output from the optical head device 120 is refracted by the protective layer 152 of the optical disc 102. When the thickness is not uniform, a spherical aberration is generated.

For example, the optical beam passing through an outer peripheral portion of the lens is collected to focal point A. The optical beam passing through an inner peripheral portion of the lens is collected to focal point B. When a spherical aberration is generated, focal point A does not match focal point B.

When there is no spherical aberration on the first information face L0 or the second information face L1, the focal point of the optical beam passing through an outer peripheral portion of the lens matches the focal point of the optical beam passing through an inner peripheral portion of the lens (focal point C). When the spherical aberration is larger, focal point A and focal point B are distanced further from each other, and an optical beam spot is entirely blurred. As a result, on the information face, the optical spot is partially defocused. The microcomputer 136, which is an embodiment of the spherical aberration correction control section 104, corrects the spherical aberration in accordance with which one of the plurality of information faces is to be irradiated with the optical beam when, for example, an objective lens having a numerical aperture of 0.8 or greater is used.

Thus, the spherical aberration is corrected in accordance with the information face, so that a proper optical beam spot is obtained, and thus information can be recorded or reproduced at a high density.

The spherical aberration correction control section 104 may correct the spherical aberration by feedback control based on a detection signal, such as a spherical aberration error detection signal generated by a spherical aberration correction detector (not shown) or an FE signal generated by the focusing error signal generator 134, or the like. Alternatively, an optimum correction amount may be searched for using, for example, a tracking error signal (not shown) or jitter representing reproduction capability, and the correction amount of the spherical aberration may be switched to the optimum correction amount. Still alternatively, the spherical aberration maybe corrected by feed-forward control based on a prescribed correction amount.

Figure 8A:
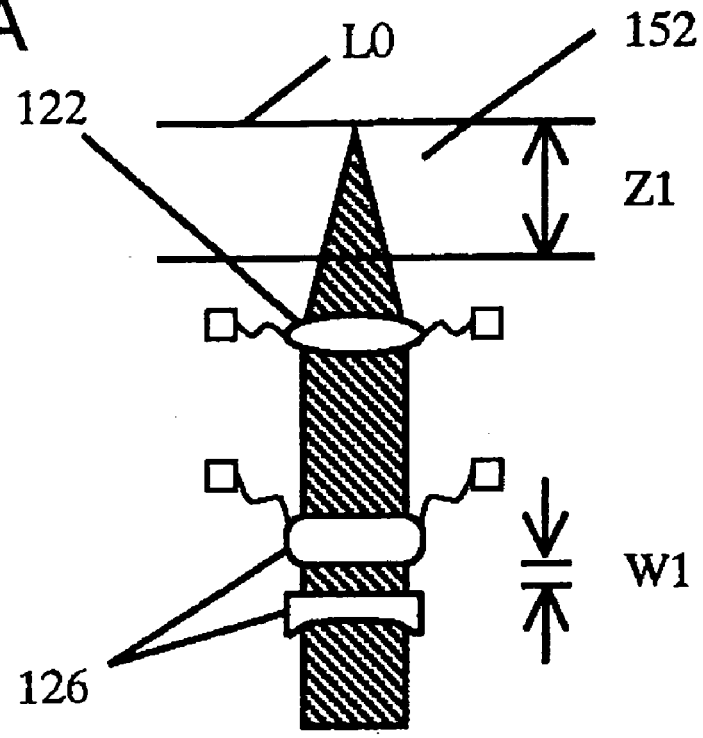
FIGS. 8A and 8B illustrate the correction of the spherical aberration according to the first example.
Figure 8B:
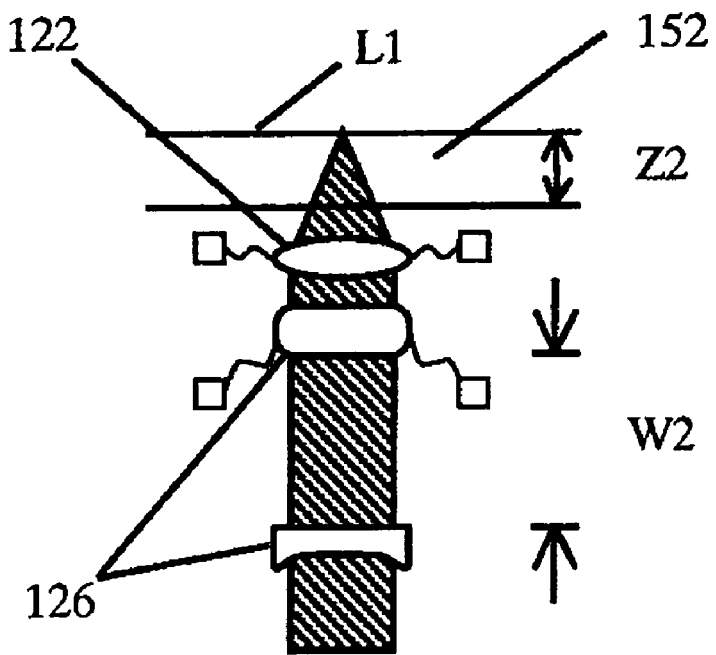

FIGS. 8A and 8B are each a schematic view illustrating correction of a spherical aberration according to the first example.

In more detail, FIG. 8A shows the spherical aberration correction lens 126 when the optical beam is converged to the first information face L0. FIG. 8B shows the spherical aberration correction lens 126 when the optical beam is converged to the second information face L1.

Distance Z1 from the surface of the protective layer 152 to the first information face L0 is longer than distance Z2 from the surface of the protective layer 152 to the second information face L1. Therefore, when the light beam is converged to the first information face L0, the distance between the concave lens member 126a and convex lens member 126b of the spherical aberration correction lens 126 is made shorter (W1) than when the light beam is converged to the second information face L1 (see FIG. 8A). Thus, the correction amount of the spherical aberration corresponding to the first information face L0 is obtained.

When the light beam is converged to the second information face L1, distance Z2 is shorter than distance Z1. Therefore, the distance between the concave lens member 126a and convex lens member 126b of the spherical aberration correction lens 126 is made longer (W2) than when the light beam is converged to the first information face L0 (see FIG. 8B). Thus, the correction amount of the spherical aberration corresponding to the second information face L1 is obtained.

As described above, the microcomputer 136 which is an embodiment of the spherical aberration correction control section 104 controls the beam expander driving circuit 138 so as to change the distance between the concave lens member 126a and convex lens member 126b. Thus, the target correction amount in accordance with the target information face can be obtained.

FIGS. 34A and 34B are each a schematic view illustrating the spherical aberration of the optical beam according to the first example of the present invention.

FIG. 34A shows the relationship between the optical beam passing through the outer peripheral portion of the optical disc and the optical beam passing through the inner peripheral portion when the distance between the concave lens member 126a and the convex lens member 126b is long. FIG. 34B shows the relationship between the optical beam passing through the outer peripheral portion of the optical disc and the optical beam passing through the inner peripheral portion when the distance between the concave lens member 126a and the convex lens member 126b is short.

Hereinafter, the relationship between (i) the distance between the concave lens member 126a and the convex lens member 126b, and (ii) the focal length of the optical beam passing through the outer peripheral portion and the focal length of the optical beam passing through the inner peripheral portion will be described by comparing FIGS. 34A and 34B.

As shown in FIGS. 34A and 34B, the optical beam passing through the outer peripheral portion and the optical beam passing through the inner peripheral portion change as the distance between the concave lens member 126a and the convex lens member 126b changes. With the spherical aberration correction lens 126, as the distance between the concave lens member 126a and the convex lens member 126b becomes shorter, the focal length of the optical beam passing through the inner peripheral portion becomes longer and the focal length of the optical beam passing through the outer peripheral portion becomes shorter. As the distance between the concave lens member 126a and the convex lens member 126b becomes longer, the focal length of the optical beam passing through the inner peripheral portion becomes shorter and the focal length of the optical beam passing through the outer peripheral portion becomes longer.

Notably, it is possible to invert the relationship between (i) the distance between the concave lens member and the convex lens member and (ii) the focal length of the optical beam passing through the outer peripheral portion and the focal length of the optical beam passing through the inner peripheral portion. This is possible by changing the structure of the spherical aberration correction lens. In more detail, it is possible to provide a structure in which as the distance between a concave lens member and a convex lens member becomes longer, the focal length of the optical beam passing through the inner peripheral portion becomes longer and the focal length of the optical beam passing through the outer peripheral portion becomes shorter.

Figure 35A:
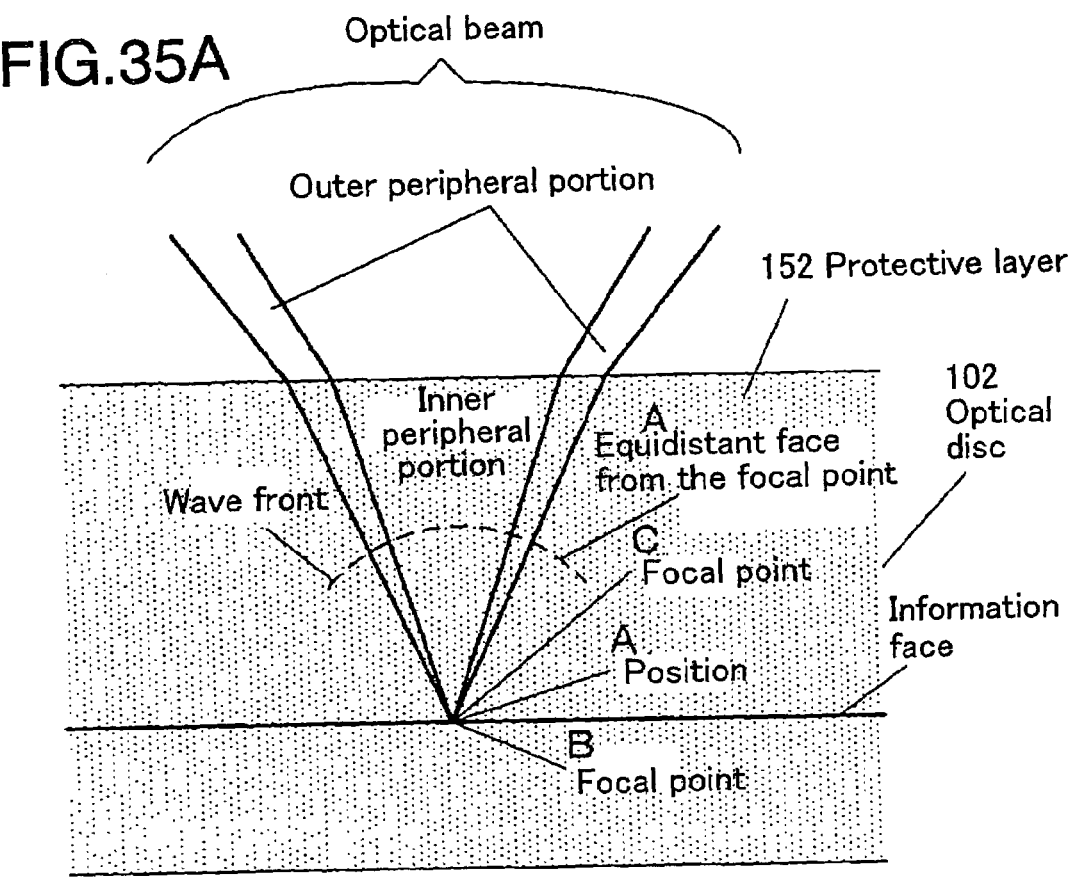
FIGS. 35A and 35B each illustrate the correction of the spherical aberration of the optical beam according to the first example.
Figure 35B:
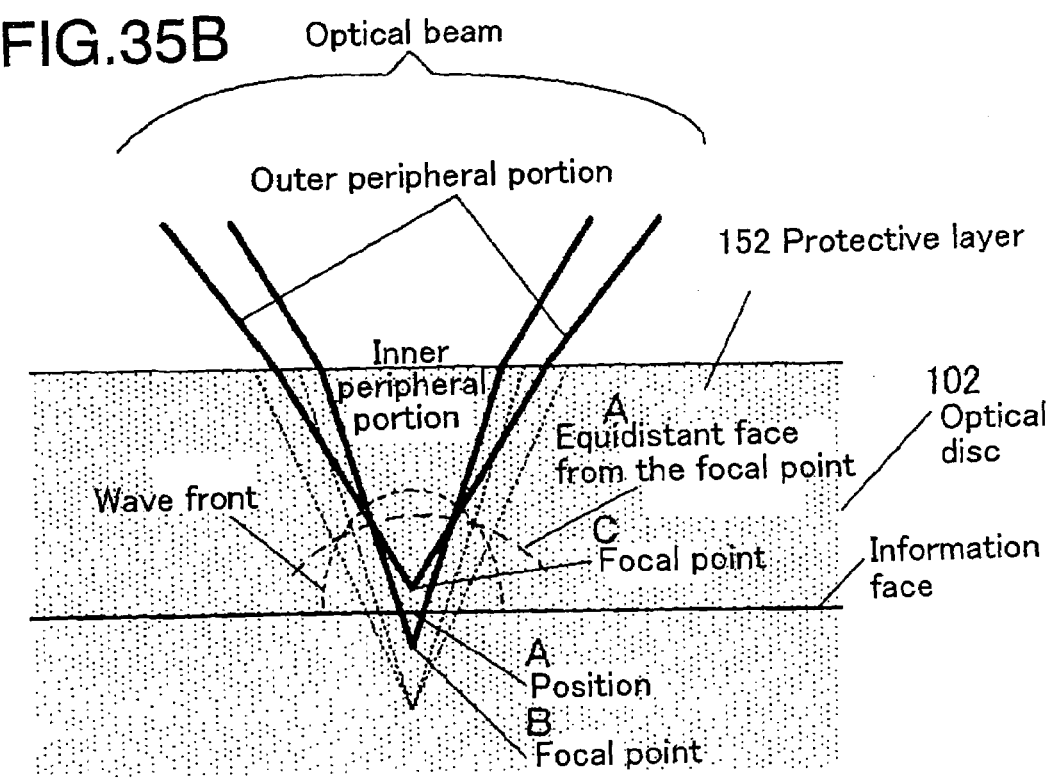

FIGS. 35A and 35B illustrate the correction of the spherical aberration of the optical beam according to the first example.

FIG. 35A shows the focal point of the optical beam passing through the outer peripheral portion and the focal point of the optical beam passing through the inner peripheral portion when the correction amount of the spherical aberration is the optimum correction amount. FIG. 35B shows the focal point of the optical beam passing through the outer peripheral portion and the focal point of the optical beam passing through the inner peripheral portion when the correction amount of the spherical aberration deviates from the optimum correction amount.

In FIGS. 35A and 35B, the correction amount of the spherical aberration is the same but the thickness of the protective layer 152 is different. Specifically, the thickness of the protective layer 152 shown in FIG. 35A is ideal, and the thickness of the protective layer 152 shown in FIG. 35B is thinner than the ideal thickness.

It is desirable that as shown in FIG. 35A, the focal point of the optical beam passing through the outer peripheral portion and the focal point of the optical beam passing through the inner peripheral portion are converged to the same position on the information face. When the thickness of the protective layer 152 is thinner than the ideal thickness, the focal length of the optical beam passing through the outer peripheral portion becomes shorter and the focal length of the optical beam passing through the inner peripheral portion becomes longer.

In such a case, as described above with reference to FIGS. 34A and 34B, the spherical aberration correction lens 126 (more specifically, the distance between the concave lens member 126a and the convex lens member 126b) is changed so as to make longer the local length of the optical beam passing through the outer peripheral portion and to make shorter the focal length of the optical beam passing through the inner peripheral portion. In this manner, the spherical aberration can be corrected by changing the spherical aberration correction lens 126.

FIG. 9 is a flowchart of an operation for switching the correction amount of the spherical aberration according to the first example.

In the first example, the microcomputer 136 as an embodiment of the spherical aberration correction control section 104 switches a spherical aberration correction lens driving signal for driving the beam expander driving circuit 138 in three stages. By the spherical aberration correction control section 104 switching a spherical aberration correction lens driving signal in three stages, the current correction amount of the spherical aberration is switched to the target correction amount. The spherical aberration correction lens driving signal is an embodiment of a spherical aberration control signal for controlling the spherical aberration correction section 112.

In step S100, the spherical aberration correction control section 104 first switches the spherical aberration correction lens driving signal so as to accelerate the spherical aberration correction lens 126 from the position thereof corresponding to the pre-switching correction amount in a direction toward the position thereof corresponding to the target correction amount.

In step S102, the spherical aberration correction control section 104 switches the spherical aberration correction lens driving signal so as to decelerate the accelerated spherical aberration correction lens 126.

In step S104, the spherical aberration correction control section 104 switches the spherical aberration correction lens driving signal so as to correspond to the target correction amount.

The spherical aberration correction control section 104 starts switching the correction amount of the spherical aberration when, for example, executing a focusing jump.

The order of the focusing jump and the switching of the correction amount is not specifically limited. In more detail, the correction amount may be switched after the focusing jump is executed, or a focusing jump may be executed after the correction amount of the spherical aberration is switched. The focusing jump and the switching of the correction amount may be executed at the same time.

FIG. 10 is a flowchart of focusing jump processing.

In step S112, the microcomputer 136, which is an embodiment of the information face movement control section 119, first turns off tracking control.

In step S114, the information face movement control section 119 holds a driving signal for focusing control and temporarily stops the focusing control.

In step S116, the information face movement control section 119 generates an accelerating pulse signal and a decelerating pulse signal based on the held driving signal, and applies the accelerating pulse signal and the decelerating pulse signal to the focusing actuator 124 via the focusing actuator driving circuit 140. Thus, the objective lens 122 is moved and the optical beam spot is moved to the target information face.

In step S118, when the FE signal reaches a focusing level for the target information face, the information face movement control section 119 releases the driving signal for focusing control from the hold state, and performs focusing control again.

In step S120, the information face movement control section 119 confirms that the focusing has been normally performed based on the driving signal for focusing control, a tracking error signal (TE signal), a reproduction signal (RF signal) or other signals.

In step S122, the information face movement control section 119 puts tracking control into an operation state, and searches for a prescribed track/sector address.

Figure 11:
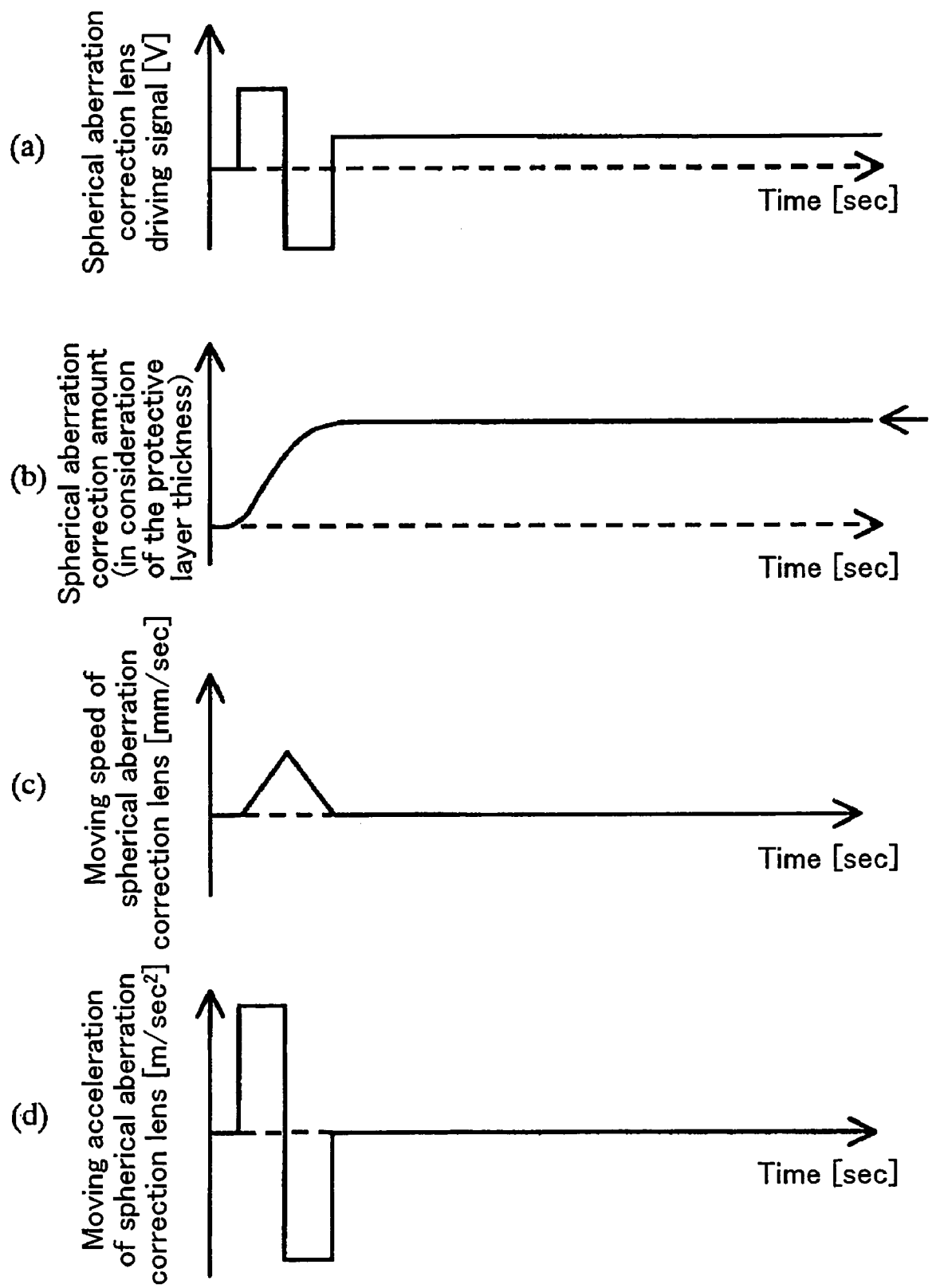
FIG. 11 is a timing diagram illustrating an operation for switching the correction amount of the spherical aberration according to the first example.

FIG. 11 is a timing diagram illustrating an operation for switching the correction amount of the spherical aberration according to the first example. Part (a) shows a time-wise change in a spherical aberration correction lens driving signal, and part (b) shows a time-wise change in a correction amount of the spherical aberration in consideration of the thickness of the protective layer. Part (c) shows a time-wise change in a moving speed of a spherical aberration correction lens, and part (d) shows a time-wise change in a moving acceleration of the spherical aberration correction lens.

As shown in part (a) of FIG. 11, the microcomputer 136 as an embodiment of the spherical aberration correction control section 104 controls the beam expander driving circuit 138 so as to switch the spherical aberration correction lens driving signal in a pulsed manner. The spherical aberration correction control section 104 switches the spherical aberration correction lens driving signal with a pulse width which is sufficiently shorter than the cycle of the primary resonance of the spherical aberration correction lens 126 of the spherical aberration correction section 112. The "pulse which is sufficiently shorter than the cycle of the primary resonance of the spherical aberration correction lens 126" means a pulse width which is shorter than the ½ cycle of the primary resonance of the spherical aberration correction lens 126, or a pulse width which is shorter than the ¼ cycle of the primary resonance of the spherical aberration correction lens 126.

As shown in parts (c) and (d) of FIG. 11, the first pulse accelerates the spherical aberration correction lens 126. The next pulse decelerates the spherical aberration correction lens 126 such that the speed thereof becomes zero when the spherical aberration correction lens 126 substantially reaches the position corresponding to the target correction amount. Here, the spherical aberration correction control section 104 controls the spherical aberration correction section 112 such that the level of the spherical aberration correction lens driving signal changes over the zone between the value of the spherical aberration correction lens driving signal corresponding to the pre-switching correction amount and the value of the spherical aberration correction lens driving signal corresponding to the target correction amount.

In this manner, as shown in part (b) of FIG. 11, when the correction amount of the spherical aberration reaches the target correction amount, the primary resonance of the spherical aberration correction lens 126 can be suppressed and the correction amount of the spherical aberration can be quickly switched. Alternatively, the spherical aberration correction control section 104 may change the level of the spherical aberration correction lens driving signal within the zone between the value of the spherical aberration correction lens driving signal corresponding to the pre-switching correction amount and the value of the spherical aberration correction lens driving signal corresponding to the target correction amount.

In the case where the level of the spherical aberration correction lens driving signal is changed over the above-described zone, the dynamic range of the spherical aberration correction lens driving signal needs to be larger than in the case where the level of the spherical aberration correction lens driving signal is changed within the zone. The dynamic range of the spherical aberration correction lens driving signal can be increased by increasing the number of bits of a D-A converter (not shown) provided in the focusing actuator driving circuit 140, i.e., by increasing the bit precision of the D-A converter.

Figure 12:
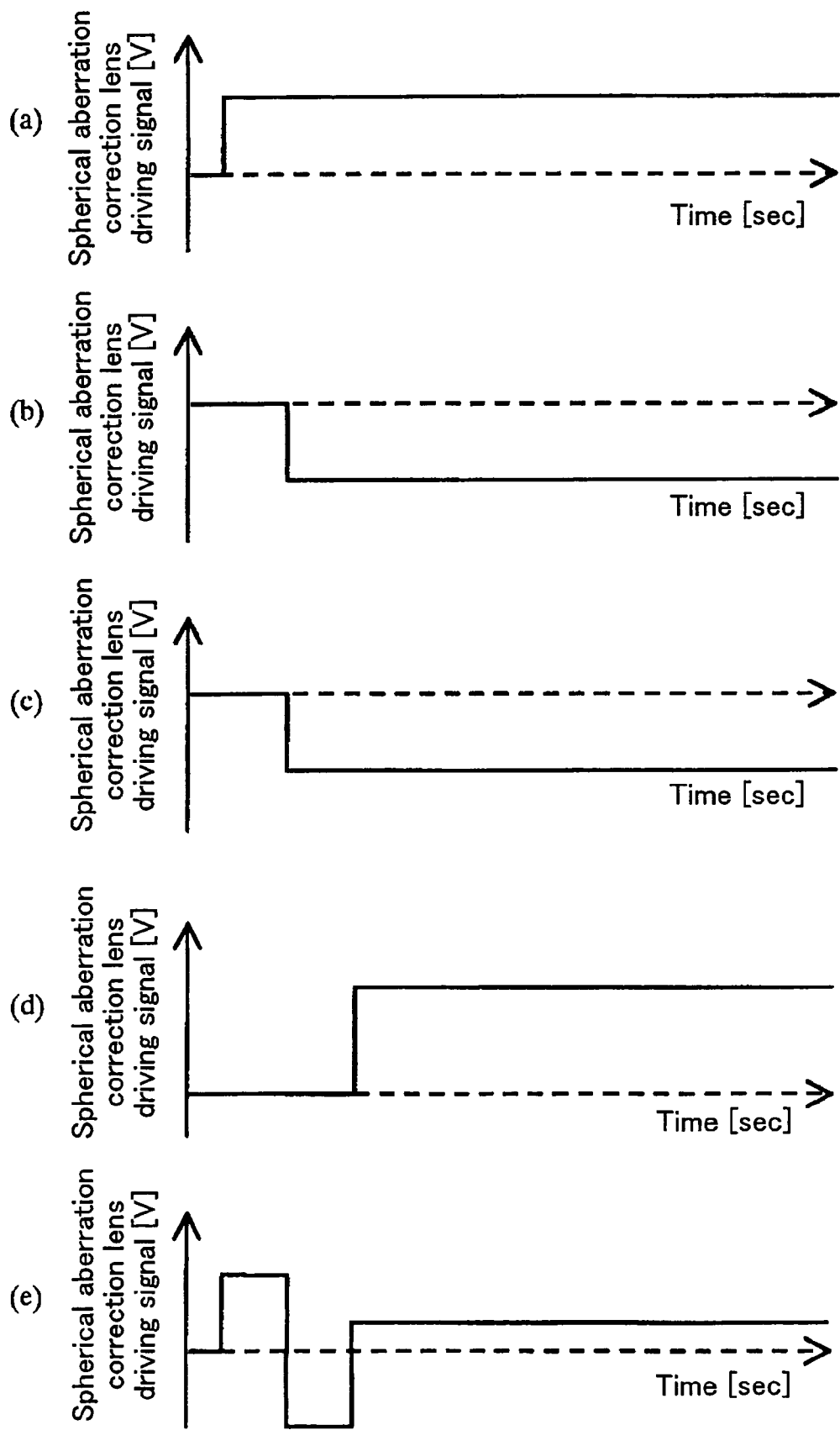
FIG. 12 is a timing diagram illustrating a structure of the spherical aberration correction lens driving signal according to the first example.

FIG. 12 is a timing diagram illustrating a structure of the spherical aberration correction lens driving signal according to the first example.

Part (e) of FIG. 12 shows a waveform representing a time-wise change similar to the time-wise change in the spherical aberration correction lens driving signal shown in part (a) of FIG. 11. Parts (a) through (d) of FIG. 12 are each obtained by dividing the components of the spherical aberration correction lens driving signal shown in part (e) of FIG. 12 into the composite one stage components.

Namely, outputting the spherical aberration correction lens driving signal shown in part (e) of FIG. 12 is physically equivalent to simultaneously outputting all the spherical aberration correction lens driving signals shown in parts (a) through (d) of FIG. 12.

Hereinafter, the spherical aberration correction lens driving signal shown in part (e) of FIG. 12 will be discussed. In the following discussion, the spherical aberration correction lens driving signal shown in part (e) of FIG. 12 is divided into a plurality of components as shown in parts (a) through (d) of FIG. 12.

Figure 13:
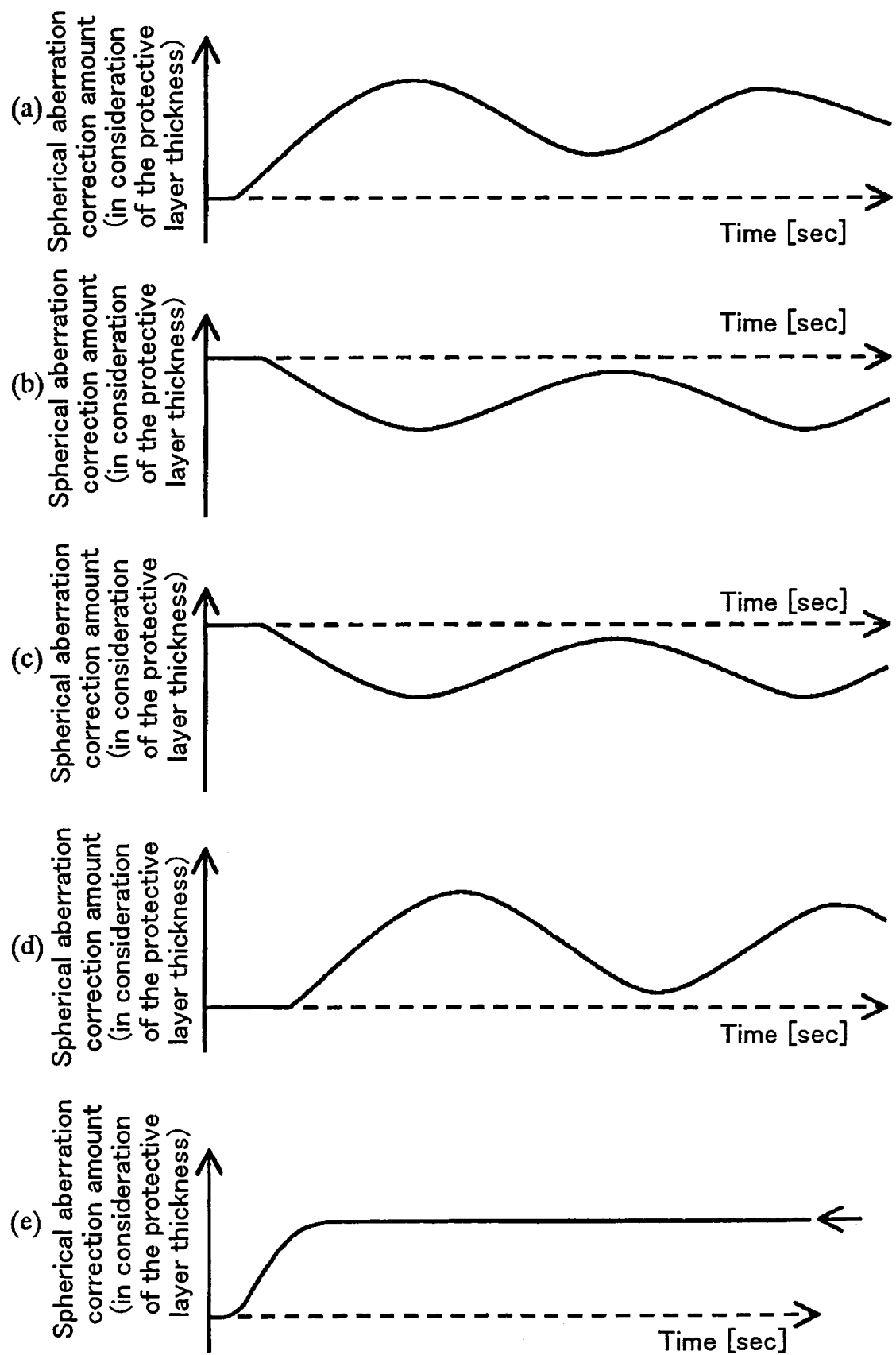
FIG. 13 is a timing diagram illustrating the correction amount of the spherical aberration corresponding to the components of the spherical aberration correction lens driving signal shown in FIG. 12.

FIG. 13 is a timing diagram illustrating the correction amount of the spherical aberration corresponding to the components of the spherical aberration correction lens driving signal shown in FIG. 12.

In more detail, parts (a) through (d) of FIG. 13 respectively show the correction amount of the spherical aberration corresponding to the components shown in parts (a) through (d) of FIG. 12.

Part (e) of FIG. 13 is obtained by adding the waveforms in parts (a) through (d) of FIG. 13. Namely, the correction amount represented by part (e) of FIG. 13 is identical to the correction amount represented by part (b) of FIG. 11. Thus, part (e) of FIG. 13 shows the time-wise change of the correction amount of the spherical aberration based on the spherical aberration correction lens driving signal shown in part (e) of FIG. 12, more specifically, the time-wise change in the movement of the spherical aberration correction lens 126.

As can be appreciated from the correction amount of the spherical aberration shown in part (e) of FIG. 13, according to the first example, the spherical aberration correction lens driving signal is generated such that the sum of the correction amounts respectively corresponding to the components of the spherical aberration correction lens driving signal is substantially zero with reference to the target correction amount. By using such a spherical aberration correction lens driving signal, the correction amount of the spherical aberration can be quickly switched to the target correction amount.

Figure 14:
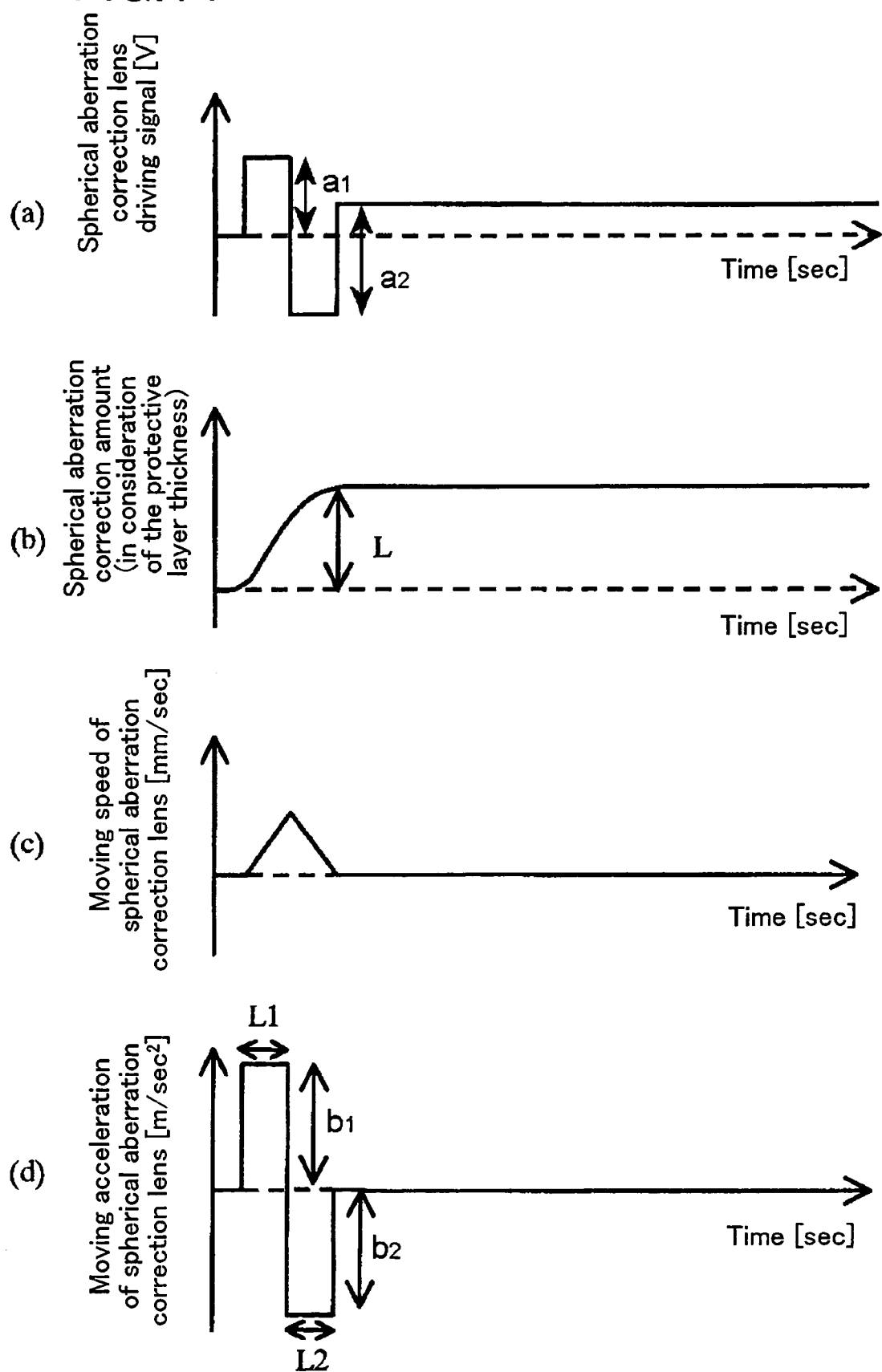
FIG. 14 is a timing diagram illustrating a method for calculating a target waveform of the spherical aberration correction lens driving signal according to the first example.

FIG. 14 is a timing diagram illustrating a method for calculating a target waveform of the spherical aberration correction lens driving signal according to the first example. Part (a) of FIG. 14 shows a waveform representing a time-wise change in the spherical aberration correction lens driving signal, and part (b) shows a time-wise change in a correction amount of the spherical aberration in consideration of the thickness of the protective layer. Part (c) shows a time-wise change in a moving speed of a spherical aberration correction lens, and part (d) shows a time-wise change in a moving acceleration of the spherical aberration correction lens. Parts (a) through (d) of FIG. 14 are identical to parts (a) through (d) of FIG. 12 except that the parameters for calculating the target waveform are provided.

The spherical aberration correction control section 104 switches the spherical aberration correction lens driving signal so as to fulfill:

$$a1 \cdot t1 + a2 \cdot t2 = 0 (t1 \leq T, t2 \leq T);$$

and $$L = |a1 \cdot t1 \cdot t1|/2 + |a2 \cdot t2 \cdot t2|/2.$$

In the above, T is a cycle of primary resonance of the spherical aberration correction lens 126; a1 is an amount of change in an amplitude of the spherical aberration control signal corresponding to an average value of the acceleration when the spherical aberration correction lens 126 is accelerated; a2 is an amount of change in an amplitude of the spherical aberration correction lens driving signal corresponding to an average value of the acceleration when the spherical aberration correction lens 126 is decelerated; t1 is an accelerating time of the spherical aberration correction lens 126; t2 is a decelerating time of the spherical aberration correction lens 126; and L is an amount of movement of the spherical aberration correction lens from the position of the spherical aberration correction lens corresponding to the correction amount before the correction amount is switched to the position of the spherical aberration correction lens 126 corresponding to the target correction amount. In part (d) of FIG. 14, b1 is the average value of the acceleration when the spherical aberration correction lens 126 is accelerated, and b2 is the average value of the acceleration when the spherical aberration correction lens 126 is decelerated.

When the parameter receiving section 16 shown in FIG. 1 receives such parameters (T, a1, a2, t1, t2, L), the spherical aberration control signal generation section 12 generates a spherical aberration control signal based on the parameters. Therefore, a spherical aberration control signal desired by the manufacturer, the user or the like can be easily generated.

The spherical aberration correction control section 104 may switch the spherical aberration correction lens driving signal in accordance with the other target waveform without specifically limiting the target waveform.

In another embodiment, the spherical aberration correction control section 104 may be formed on a single substrate. In this case, the spherical aberration correction control section 104 preferably includes the parameter receiving section 16. By the spherical aberration correction control section 104 including the parameter receiving section 16, the spherical aberration correction control section 104 can control the spherical aberration correction section 112 so as to properly correct the spherical aberration by merely inputting parameters for generating a desired spherical aberration control signal to the parameter receiving section 16.

The spherical aberration correction control section 104 may further include a parameter memory section (not shown) for storing parameters received by the parameter receiving section 16. The parameter memory section is, for example, a flash memory. When the spherical aberration correction control section 104 includes the parameter memory section, it is preferable that the parameter receiving section 16 receives the parameters stored in the parameter memory section when the spherical aberration correction control section 104 is started, and the spherical aberration control signal generation section 12 generates a spherical aberration control signal based on the parameters. The parameter memory section may be provided outside the spherical aberration correction control section 104. For example, a memory (not shown) for the microcomputer 136 may function as a parameter memory section.

As described above, according to the first example, the spherical aberration correction control section 104 generates a spherical aberration control signal such that the sum of the correction amounts corresponding to the components of the spherical aberration control signal becomes substantially zero with respect to the target correction amount. Thus, the correction amount of the spherical aberration can be quickly switched to the target correction amount without the correction amount of the spherical aberration fluctuating. In more detail, the spherical aberration correction control section 104 switches the spherical aberration control signal in three stages. In this manner, as compared with the conventional one-stage switching, the primary resonance of the spherical aberration correction section 112 can be suppressed, and thus the time required for switching the correction amount of the spherical aberration can be shortened.

EXAMPLE 2

Figure 15:
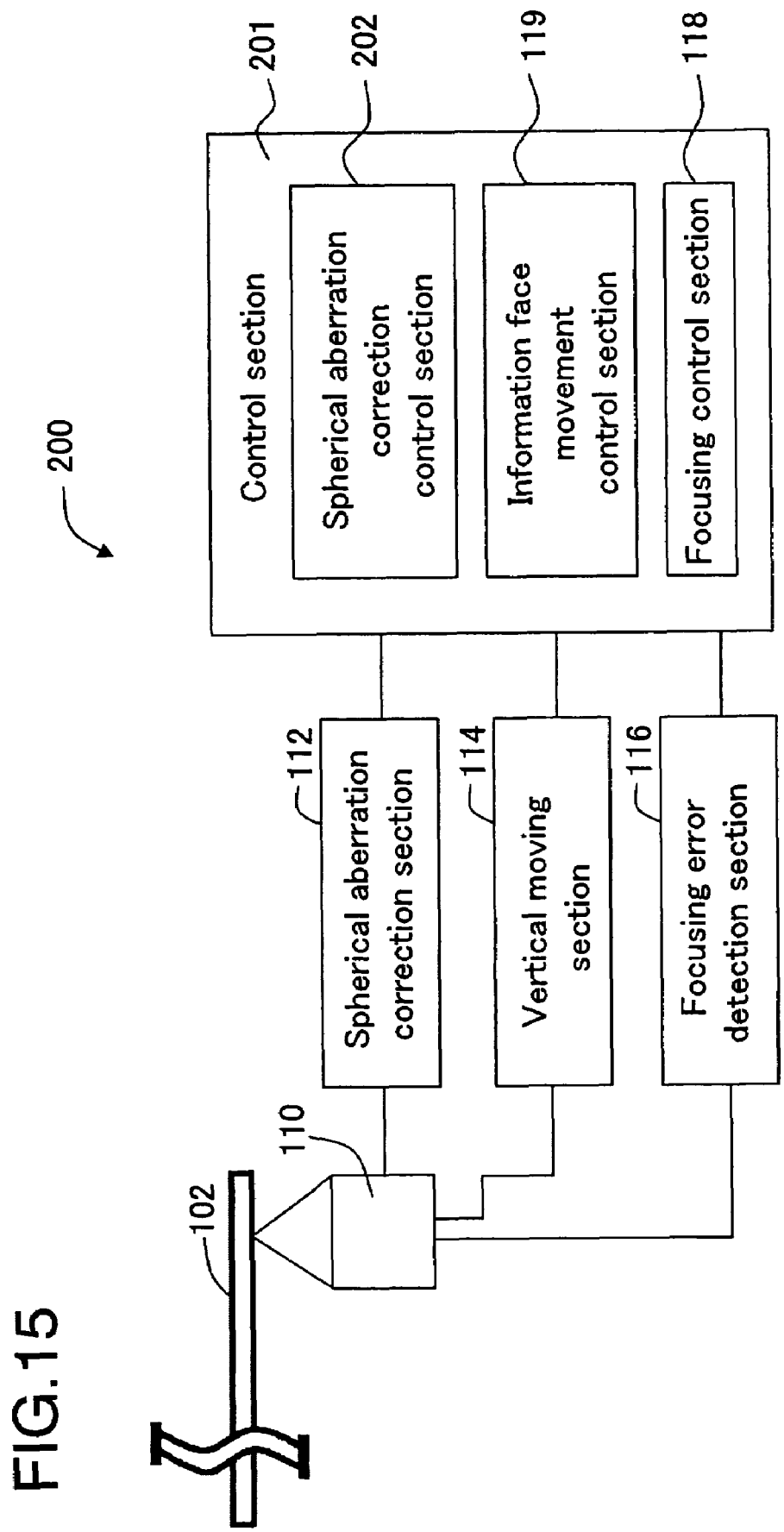
FIG. 15 is a schematic diagram illustrating a general functional structure of an optical disc apparatus according to a second example of the present invention.

FIG. 15 is a schematic diagram illustrating a general functional structure of an optical disc apparatus 200 according to a second example of the present invention. FIG. 15 corresponds to FIG. 2.

Identical elements of the optical disc apparatus 200 shown in FIG. 15 previously discussed with respect to the optical disc apparatus 100 in FIG. 2 bear identical reference numerals and the detailed descriptions thereof will be omitted to avoid redundancy.

The optical disc apparatus 200 includes a converging section 110, a spherical aberration correction section 112, a vertical moving section 114, a focusing error detection section 116, and a control section 201. The control section 201 includes a spherical aberration correction control section 202, an information face movement control section 119, and a focusing control section 118.

The control section 201 has a similar structure and operates in a similar manner to the control section 117 in the first example, but is different from the control section 117 in that the spherical aberration control signal is switched in two stages. The spherical aberration correction control section 202 has a similar structure and operates in a similar manner to the spherical aberration correction control section 104 in the first example, but is different from the spherical aberration correction control section 104 in that the spherical aberration correction control section 202 switches the spherical aberration control signal in two stages.

Here, the spherical aberration correction control section 202 is shown as one element of the optical disc apparatus 200, but the spherical aberration correction control section 202 acts as a spherical aberration correction control device for controlling the spherical aberration correction section 112 for correcting a spherical aberration even when not included in the optical disc apparatus 200.

Figure 16:
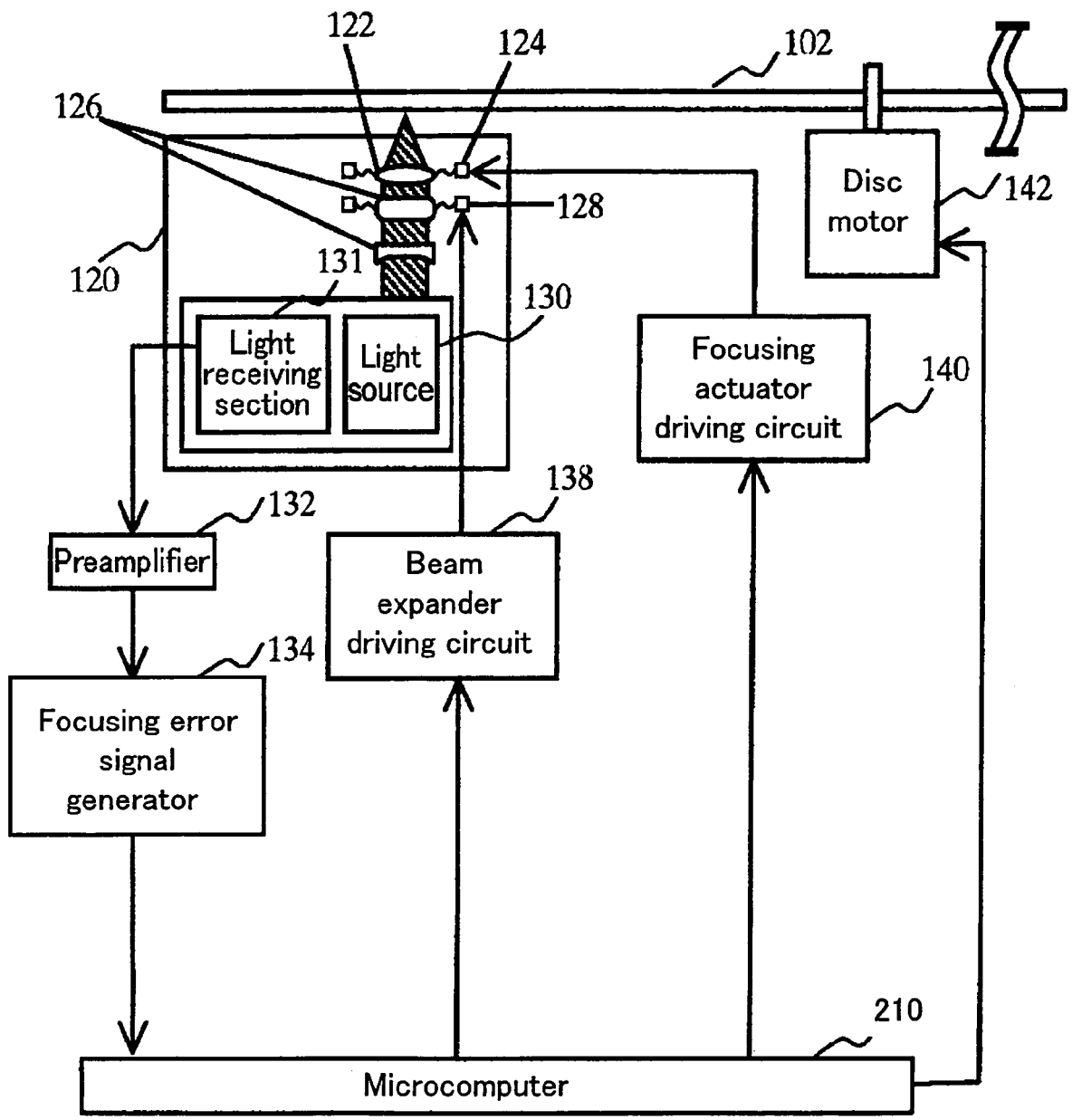
FIG. 16 is a schematic view illustrating an example of a hardware structure of the optical disc apparatus shown in FIG. 15.

FIG. 16 is a schematic view illustrating an example of a hardware structure of the optical disc apparatus 200 shown in FIG. 15. FIG. 16 corresponds to FIG. 3.

Identical elements of the optical disc apparatus 200 shown in FIG. 16 previously discussed with respect to the optical disc apparatus 100 in FIG. 3 bear identical reference numerals and the detailed descriptions thereof will be omitted to avoid redundancy.

The optical disc apparatus 200 includes an optical head device 120, a preamplifier 132, a focusing error signal generator 134, a microcomputer 210, a beam expander driving circuit 138, a focusing actuator driving circuit 140, and a disc motor 142.

The microcomputer 210 has a similar structure and operates in a similar manner to the microcomputer 136 in the first example, but is different from the microcomputer 136 in that the microcomputer 210 switches the spherical aberration control signal in two stages. The microcomputer 210 is an embodiment of the control section 201 shown in FIG. 15.

With reference to FIGS. 17 through 21, an operation of the optical disc apparatus 200 having the above-described structure will be described.

Figure 17:
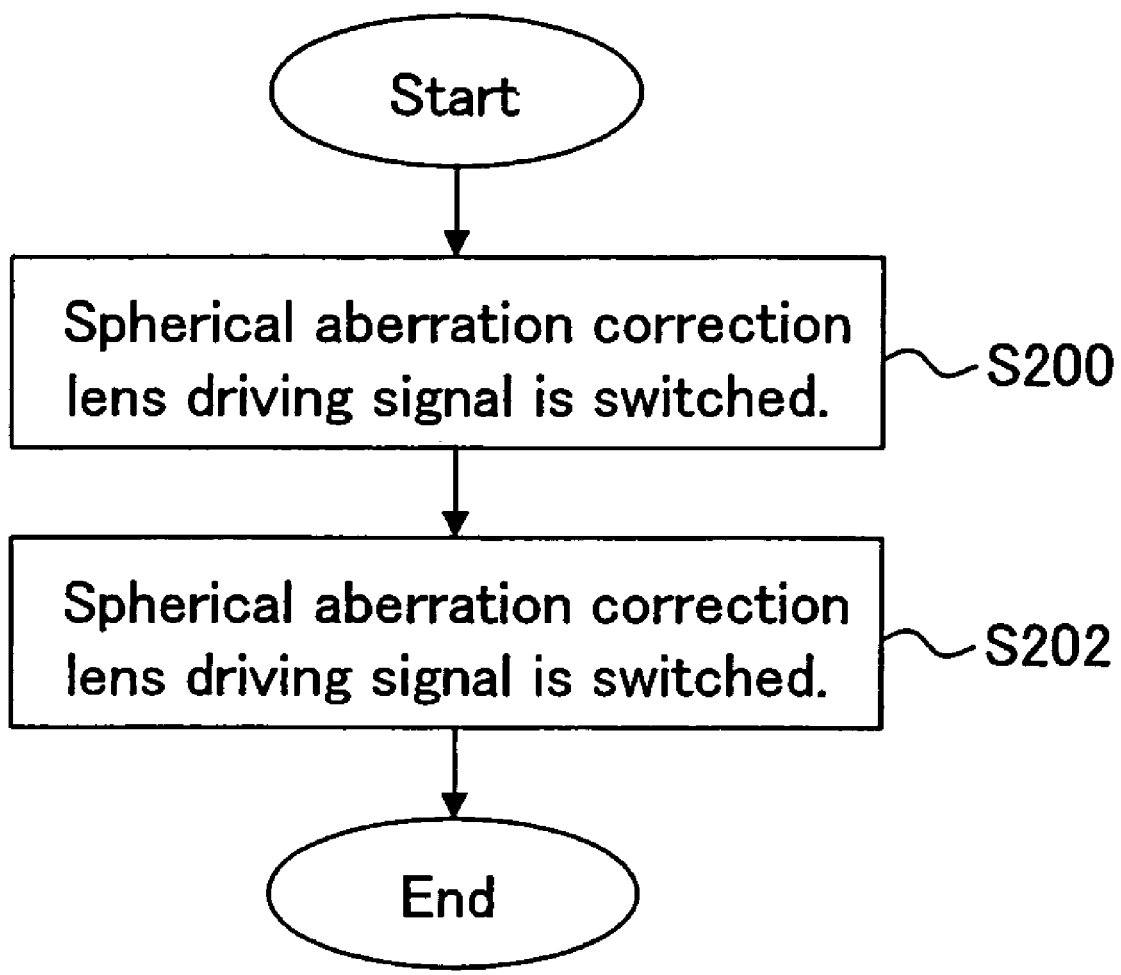
FIG. 17 is a flowchart of an operation for switching the correction amount of the spherical aberration according to the second example.

FIG. 17 is a flowchart of an operation for switching the correction amount of the spherical aberration according to the second example.

In the second example, the microcomputer 210 as an embodiment of the spherical aberration correction control section 202 switches a spherical aberration correction lens driving signal in two stages. In this manner, the microcomputer 210 controls the spherical aberration correction lens 126 so as to switch the current correction amount of the spherical aberration to a target correction amount. Here, the spherical aberration correction lens driving signal is an embodiment of the spherical aberration control signal for controlling the spherical aberration correction section 112.

In step S200, the spherical aberration correction control section 202 performs first step switching for switching the spherical aberration correction lens driving signal in a stepped manner so as to correspond to a prescribed correction amount between the pre-switching correction amount and the target correction amount.

In step S202, the spherical aberration correction control section 202 performs second step switching for switching the spherical aberration correction lens driving signal in a stepped manner so as to correspond to the target correction amount.

The spherical aberration correction actuator 128 for driving the spherical aberration correction lens 126 includes an elastic element such as a leaf spring having an attenuation coefficient $\zeta<1$ or other springs. Therefore, if the spherical aberration correction lens driving signal is switched in a stepped manner and held at that level, the correction amount of the spherical aberration exceeds the correction amount corresponding to the level of the spherical aberration correction lens driving signal. In consideration of such an overshoot of the correction amount, the prescribed correction amount in the first step switching is set such that the maximum value of the correction amount of the spherical aberration when an overshoot occurs is the target correction amount.

As described above, the spherical aberration control signal generation section 12 sets the prescribed correction amount such that the maximum value of the correction amount in the first step switching is the target correction amount. Thus, the spherical aberration correction lens driving signal can be switched in two stages, and the sum of the correction amounts corresponding to the components of the spherical aberration correction lens driving signal can be made substantially zero with respect to the target correction amount.

Figure 18:
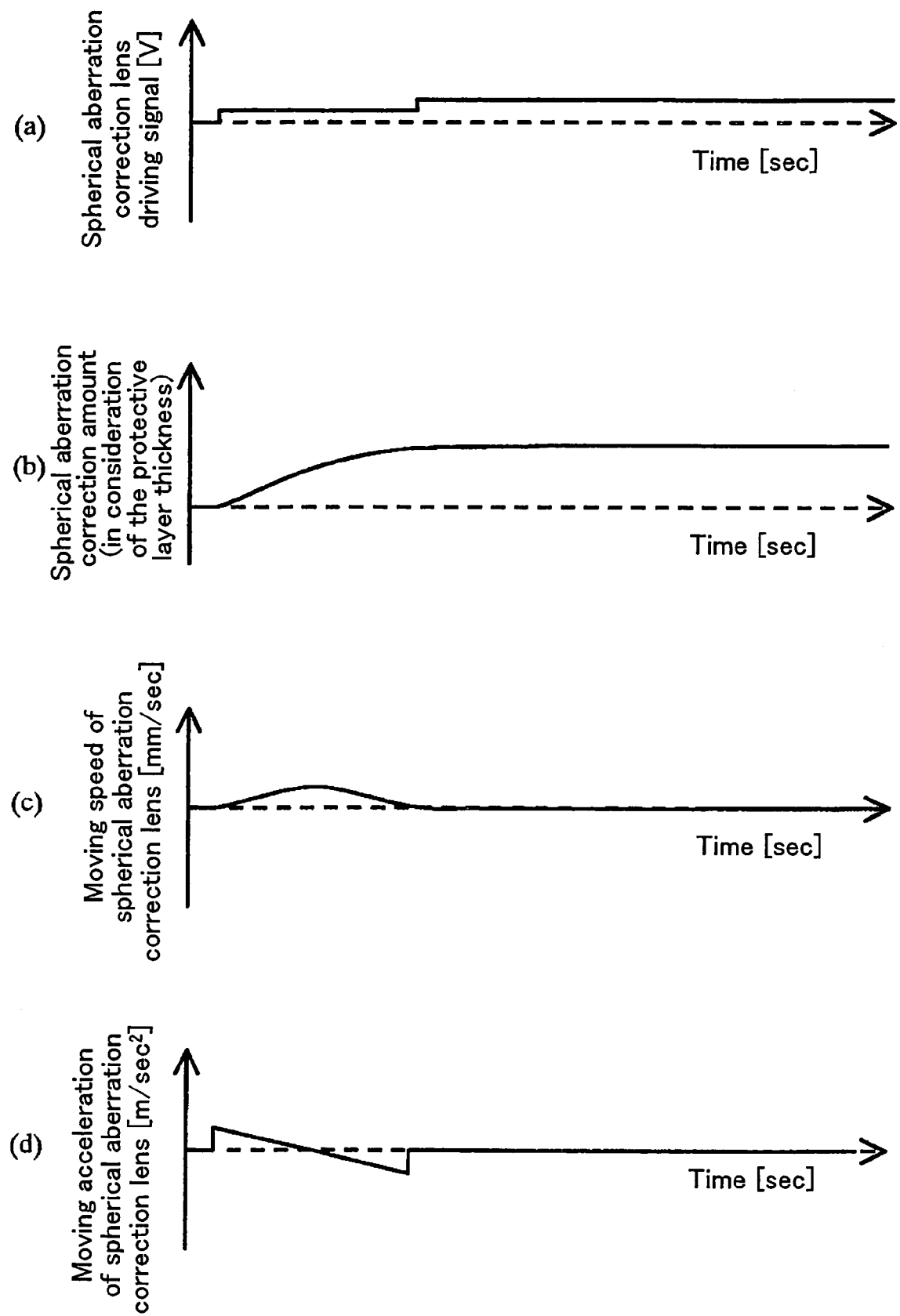
FIG. 18 is a timing diagram illustrating an operation for switching the correction amount of the spherical aberration according to the second example.

FIG. 18 is a timing diagram illustrating an operation for switching the correction amount of the spherical aberration according to the second example. Part (a) shows a time-wise change in a spherical aberration correction lens driving signal, and part (b) shows a time-wise change in a correction amount of the spherical aberration in consideration of the thickness of the protective layer. Part (c) shows a time-wise change in a moving speed of a spherical aberration correction lens, and part (d) shows a time-wise change in a moving acceleration of the spherical aberration correction lens.

As shown in part (a) of FIG. 18, the microcomputer 210 as an embodiment of the spherical aberration correction control section 202 controls the beam expander driving circuit 138 so as to switch the spherical aberration correction lens driving signal in a stepped manner. The spherical aberration correction control section 202 changes the spherical aberration correction lens driving signal within the zone between the value of the spherical aberration correction lens driving signal corresponding to the pre-switching correction amount and the value of the spherical aberration correction lens driving signal corresponding to the target correction amount. In this case, it is not necessary to increase the dynamic range of the spherical aberration correction lens driving signal, and therefore an increase in the number of bits of the D-A converter included in the focusing actuator driving circuit 140 can be suppressed.

As shown in parts (c) and (d) of FIG. 18, by the first step switching, the spherical aberration correction lens 126 is accelerated until reaching the position thereof corresponding to a prescribed correction amount. After reaching the position thereof corresponding to the prescribed correction amount, the spherical aberration correction lens 126 is decelerated. The speed of the spherical aberration correction lens 126 becomes substantially zero when substantially reaching the position thereof corresponding to the target correction amount. At this point, the spherical aberration correction control section 202 performs second step switching. By this, as shown in part (b) of FIG. 18, the primary resonance of the spherical aberration correction lens 126 can be suppressed, and the correction amount of the spherical aberration can be quickly switched to the prescribed correction amount.

Figure 19:
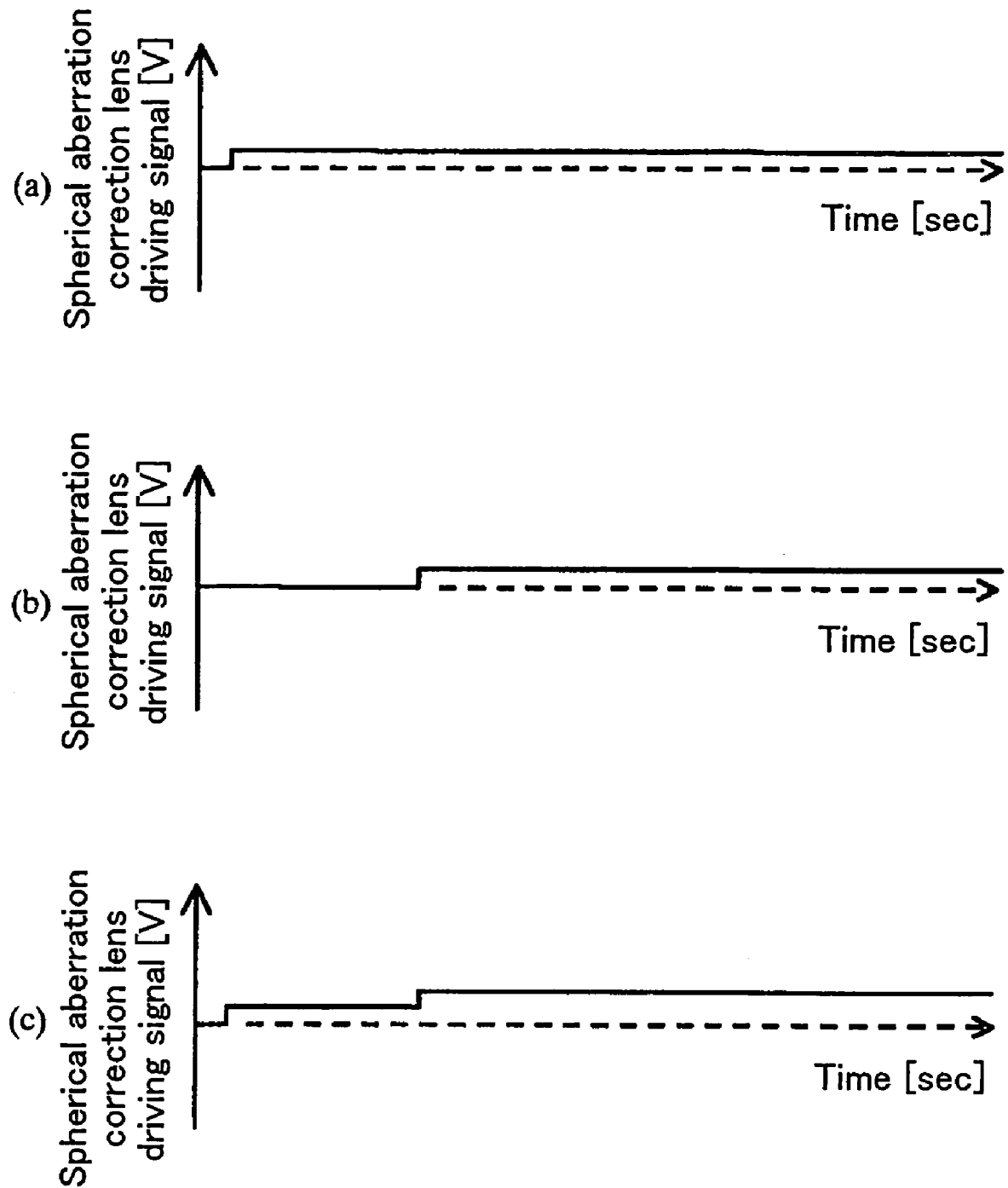
FIG. 19 is a timing diagram illustrating a structure of the spherical aberration correction lens driving signal according to the second example.

FIG. 19 is a timing diagram illustrating a structure of the spherical aberration correction lens driving signal according to the second example.

Part (c) of FIG. 19 is a waveform similar to the waveform shown in part (a) of FIG. 18. Parts (a) and (b) of FIG. 19 are each obtained by dividing the components of the spherical aberration correction lens driving signal shown in part (c) of FIG. 19 into the composite one stage components.

The waveform of the spherical aberration correction lens driving signal shown in part (c) of FIG. 19 can be divided into a plurality of components as shown in parts (a) and (b) of FIG. 19.

Figure 20:
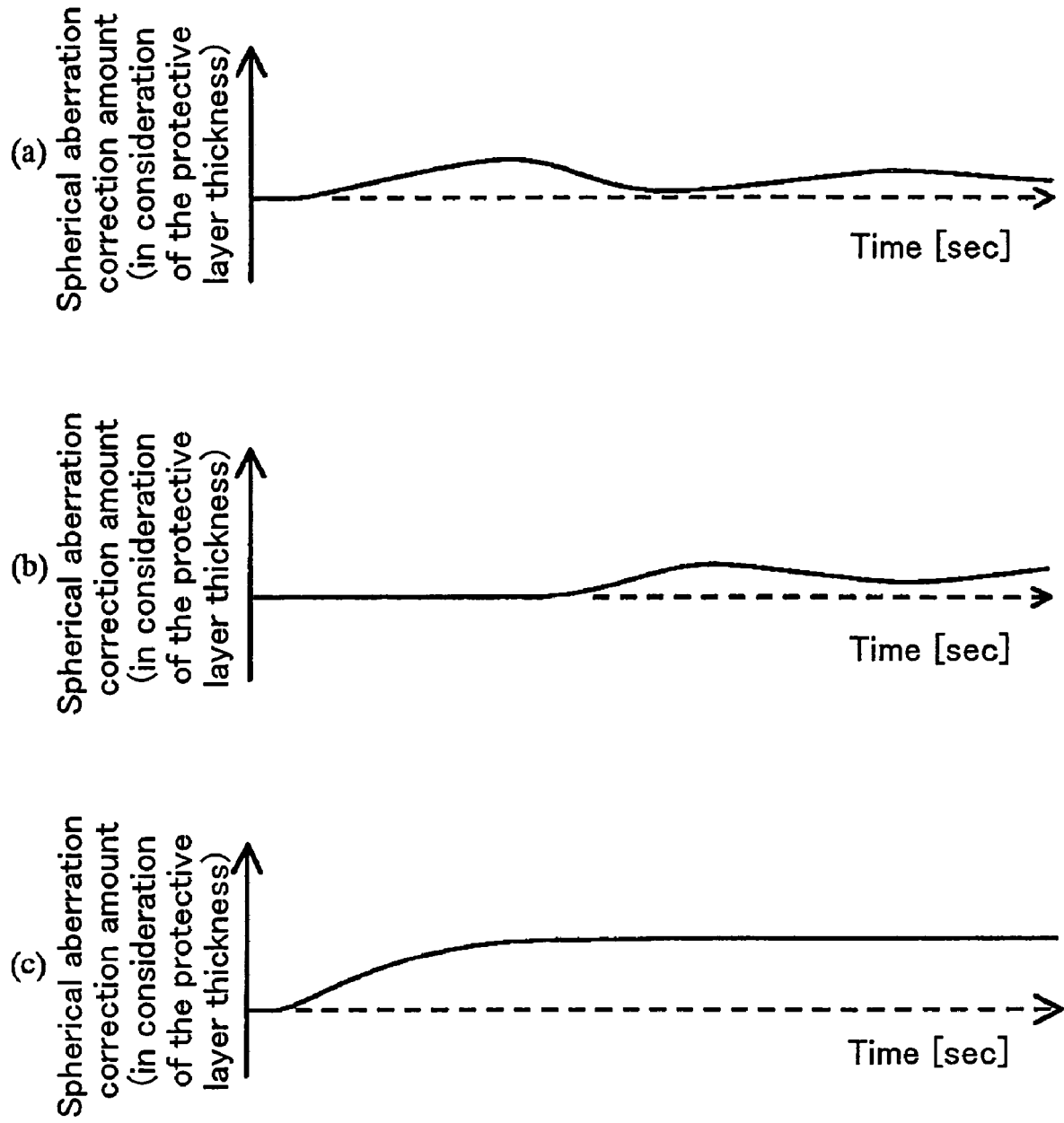
FIG. 20 is a timing diagram illustrating the correction amount of the spherical aberration corresponding to the components of the spherical aberration correction lens driving signal shown in FIG. 19.

FIG. 20 is a timing diagram illustrating the correction amount of the spherical aberration corresponding to the components of the spherical aberration correction lens driving signal shown in FIG. 19.

In more detail, parts (a) through (d) of FIG. 20 respectively show the correction amount of the spherical aberration corresponding to the components shown in parts (a) and (b) of FIG. 19.

Part (c) of FIG. 20 is obtained by adding the waveforms in parts (a) and (b) of FIG. 20. Namely, the waveform represented by part (c) of FIG. 20 is similar to the waveform represented by part (b) of FIG. 18. Thus, part (c) of FIG. 20 shows the time-wise change of the correction amount of the spherical aberration based on the spherical aberration correction lens driving signal shown in part (c) of FIG. 19, more specifically, the time-wise change in the movement of the actual spherical aberration correction lens 126.

As can be appreciated from the correction amount of the spherical aberration shown in part (c) of FIG. 20, according to the second example also, the spherical aberration correction lens driving signal is generated such that the sum of the correction amounts respectively corresponding to the components of the spherical aberration correction lens driving signal is substantially zero with reference to the target correction amount. Therefore, the correction amount of the spherical aberration can be quickly switched to the target correction amount.

Figure 21:
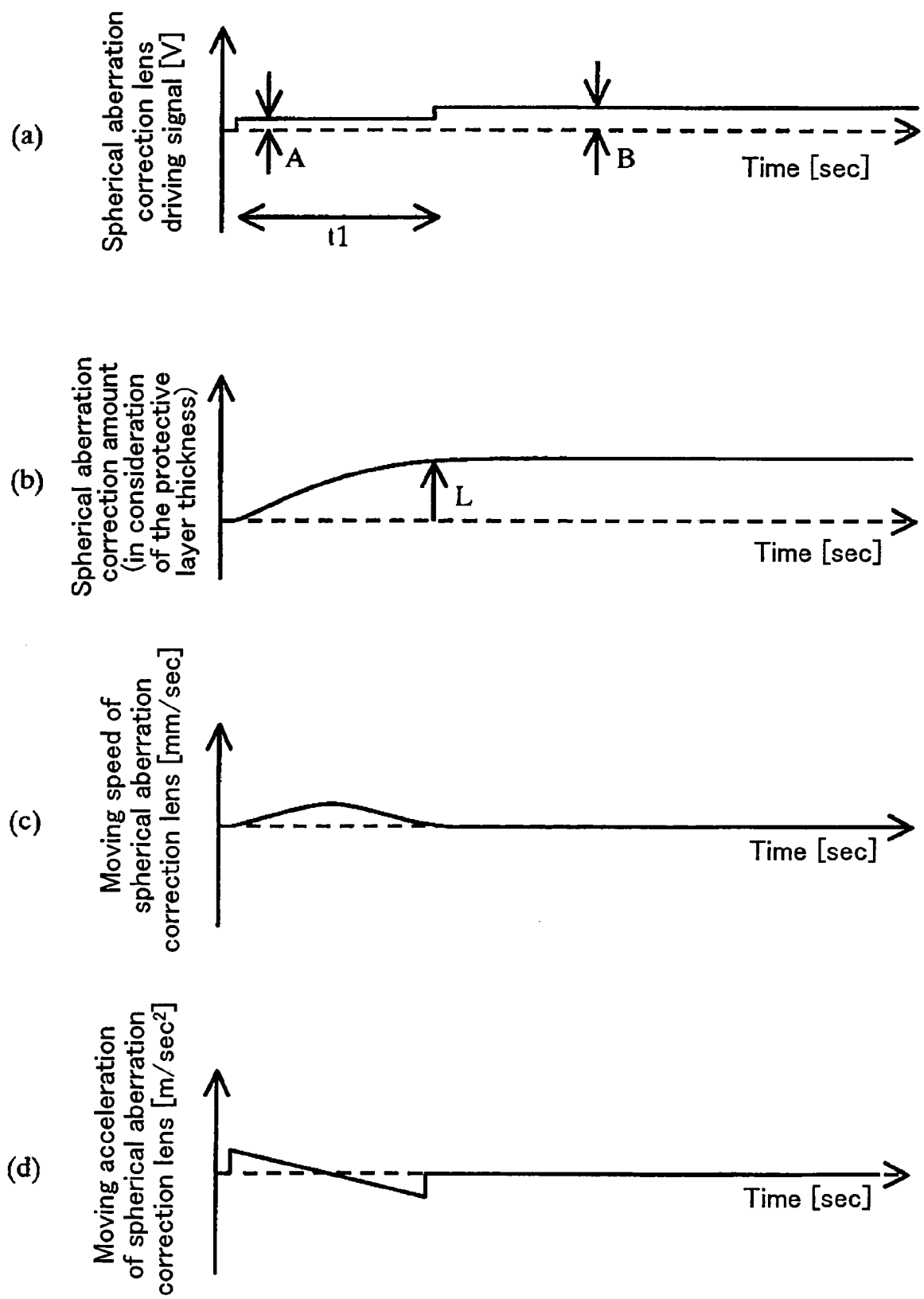
FIG. 21 is a timing diagram illustrating a method for calculating a target waveform of the spherical aberration correction lens driving signal according to the second example.

FIG. 21 is a timing diagram illustrating a method for calculating a target waveform of the spherical aberration correction lens driving signal according to the second example. Part (a) of FIG. 21 shows a waveform representing a time-wise change in the spherical aberration correction lens driving signal, and part (b) shows a time-wise change in a correction amount of the spherical aberration in consideration of the thickness of the protective layer. Part (c) shows a time-wise change in a moving speed of a spherical aberration correction lens, and part (d) shows a time-wise change in a moving acceleration of the spherical aberration correction lens. Parts (a) through (d) of FIG. 21 are identical to parts (a) through (d) of FIG. 18 except that the parameters for calculating the target waveform are provided.

The spherical aberration correction control section 202 switches the spherical aberration correction lens driving signal so as to fulfill:

$A=(L/K1)/(1+\exp(-\omega n \cdot \zeta \cdot t1)/\mathrm{sqrt}(1-\zeta \cdot \zeta))$ $B=L/K1$ $t1=(3\pi/2-\mathrm{atn}(\mathrm{sqrt}(1-\zeta \cdot \zeta)/\zeta)/(\omega n \cdot \mathrm{sqrt}(1-\zeta \cdot \zeta))).$ In the above, A is an amount of change in an amplitude of the spherical aberration correction lens driving signal between the spherical aberration control signal before the first step switching and the spherical aberration correction lens driving signal after the first step switching; B is an amount of change in an amplitude of the spherical aberration correction lens driving signal between the spherical aberration correction lens driving signal before the first step switching and the spherical aberration correction lens driving signal after the second step switching; t1 is a time period from the first step switching to the second step switching; L is an amount of movement of the spherical aberration correction lens 126 from a position of the spherical aberration correction lens 126 corresponding to the correction amount before the first step switching to a position of the spherical aberration correction lens 126 corresponding to the target correction amount; $\zeta$ is an attenuation coefficient of the spherical aberration correction lens 126 ($\zeta<1$); $\omega n$ is a primary resonance angular frequency of the spherical aberration correction lens 126; K1 is a sensitivity of the spherical aberration correction section 112; exp( ) is an operation symbol of an index having Napier's number as the base; sqrt( ) is an operation symbol of square root; and atn ( ) is an operation symbol of arc tangent.

In the second example also, when the parameter receiving section 16 shown in FIG. 1 receives parameters (A, B, t1, L, $\zeta$, $\omega n$, K1), the spherical aberration control signal generation section 12 generates a spherical aberration control signal based on the parameters. Therefore, a spherical aberration control signal desired by the manufacturer, the user or the like can be easily generated.

The spherical aberration correction control section 202 may switch the spherical aberration correction lens driving signal in accordance with the other target waveform without specifically limiting the target waveform.

As described above, according to the second example, the spherical aberration correction control section 202 changes the spherical aberration correction lens driving signal within the zone between the value of the spherical aberration correction lens driving signal corresponding to the pre-switching correction amount and the value of the spherical aberration correction lens driving signal corresponding to the target correction amount. By such two-stage switching of the spherical aberration control signal by the spherical aberration correction control section 202, it is not necessary to increase the dynamic range of the spherical aberration correction lens driving signal, and therefore a D-A converter of a smaller number of bits can be used, unlike the first example. Accordingly, the production cost of the optical disc apparatus 200 can be reduced.

EXAMPLE 3

When an optical disc apparatus is arranged in a different manner, for example, the optical disc which has been located vertically is located horizontally or vice versa, the correction amount of the spherical aberration may be undesirably deviated as a result of the spherical aberration correction lens being deviated from a proper position due to its own weight. There is a variance in the thickness of the protective layer of optical discs, and the correction amount of the spherical aberration may be undesirably deviated due to the influence of variance in the thickness.

According to a third example of the present invention, when the correction amount of the spherical aberration deviates, the correction amount of the spherical aberration is calibrated when, for example, the optical disc apparatus is started.

Figure 22:
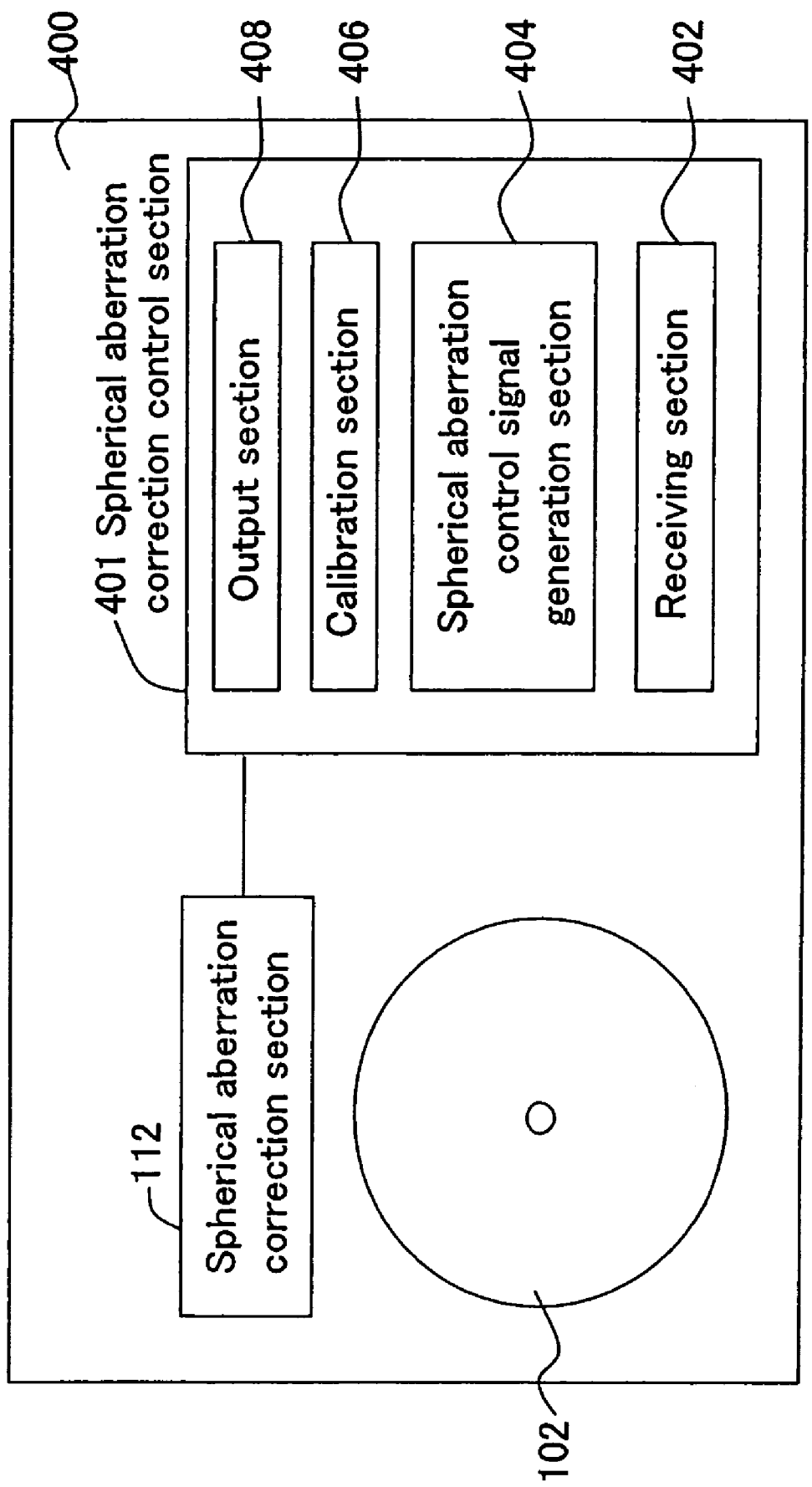
FIG. 22 is a schematic view of an optical disc apparatus according to a third example of the present invention.

FIG. 22 is a schematic view of an optical disc apparatus 400 according to the third example of the present invention.

The optical disc apparatus 400 includes a spherical aberration correction section 112 for correcting a spherical aberration of an optical beam irradiating the optical disc 102, and a spherical aberration correction control section 401 for controlling the spherical aberration correction section 112.

The spherical aberration correction control section 401 includes a receiving section 402 for receiving a deviation amount of the spherical aberration, a spherical aberration control signal generation section 404 for generating a spherical aberration control signal, a calibration section 406 for calibrating the spherical aberration control signal based on the deviation amount of the spherical aberration which is received by the receiving section 402, and an output section 408 for outputting the spherical aberration control signal calibrated by the calibration section 406 to the spherical aberration correction section 112.

The receiving section 402 may have a similar function to that of the parameter receiving section 16 described in the first example with reference to FIG. 1. In more detail, the spherical aberration control signal generation section 404 may generate a spherical aberration control signal based on the parameters received by the receiving section 402.

The calibration section 406 calibrates the spherical aberration control signal based on the deviation amount of the spherical aberration. The calibration section 406, for example, calculates an offset which is to be added to the spherical aberration control signal based on the deviation amount of the spherical aberration. Next, the calibration section 406 adds the calculated offset to the spherical aberration control signal, so as to calibrate the correction amount of the spherical aberration.

The spherical aberration correction control section 401 has a similar structure and operates in a similar manner to the spherical aberration correction control section 104 described above with reference to FIG. 1, but is different from the spherical aberration correction control section 104 in that the spherical aberration correction control section 401 outputs a spherical aberration control signal which has been calibrated based on the deviation amount.

Figure 23:
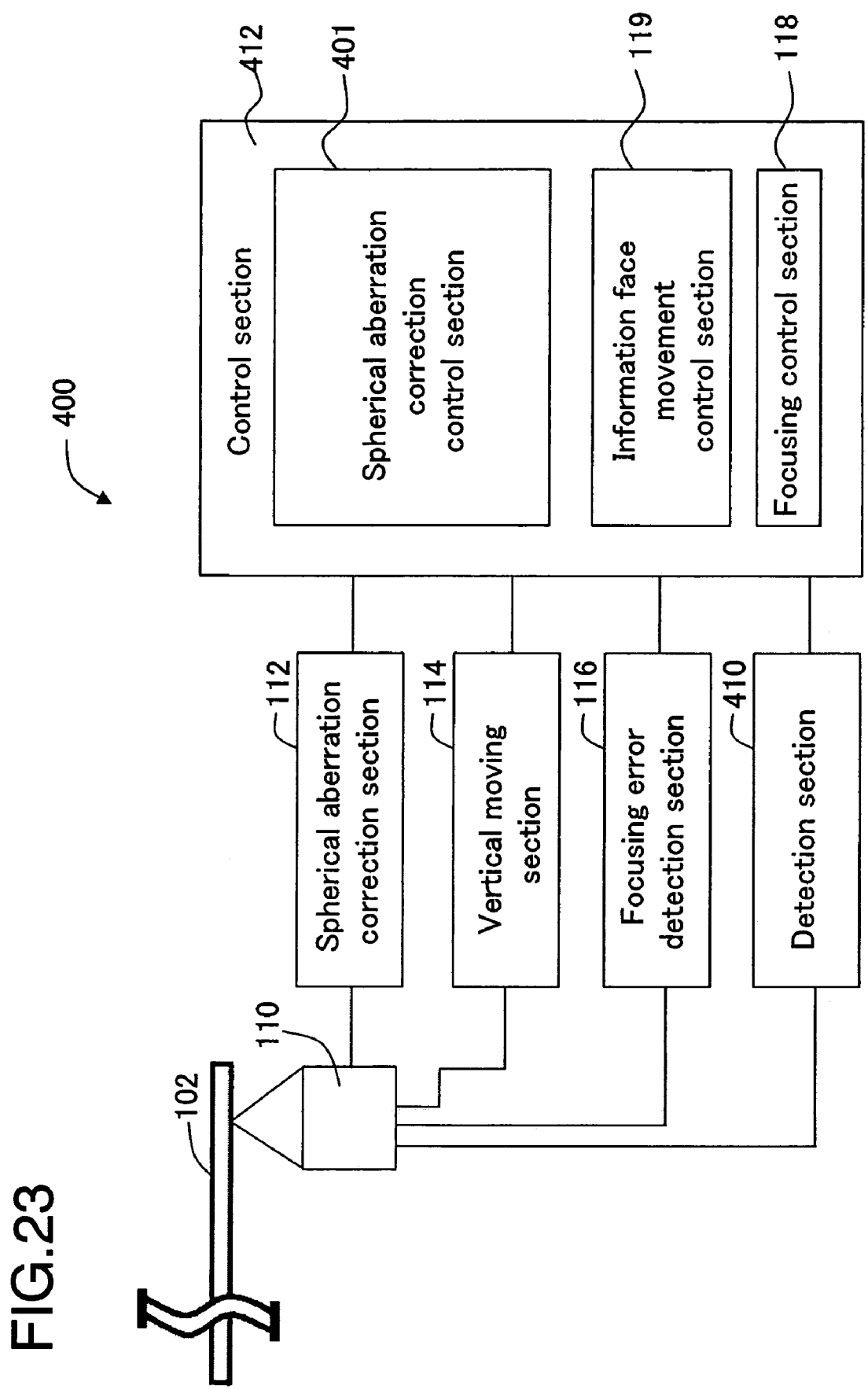
FIG. 23 is a schematic view illustrating a general functional structure of the optical disc apparatus shown in FIG. 22.

FIG. 23 is a schematic view illustrating a general functional structure of the optical disc apparatus 400 shown in FIG. 22.

Identical elements of the optical disc apparatus 400 previously discussed with respect to the optical disc apparatus 100 in FIG. 2 and the optical disc apparatus 200 in FIG. 15 bear identical reference numerals and the detailed descriptions thereof will be omitted to avoid redundancy.

The optical disc apparatus 400 includes a converging section 110, a spherical aberration correction section 112, a vertical moving section 114, a focusing error detection section 116, a detection section 410, and a control section 412.

The control section 412 includes a spherical aberration correction control section 401, an information face movement control section 119, and a focusing control section 118.

The detection section 410 detects a deviation amount of the spherical aberration. The detection section 410 detects the deviation amount of the spherical aberration when, for example, the optical disc apparatus 400 is started. The method for detecting the deviation amount is not specifically limited. For example, the deviation amount may be detected based on a TE signal or based on an error rate of data which has been read from the optical disc 102. The deviation amount may be detected based on jitter between a reproduction signal from the optical disc 102 and a reproduction reference clock signal.

The control section 412 has a similar structure and operates in a similar manner to the control section 117 described in the first example with reference to FIG. 2 and the control section 201 described in the second example with reference to FIG. 15, but is different from the control section 117 and the control section 201 in that the control section 412 includes a spherical aberration correction control section 401.

The calibration section 406 calibrates the spherical aberration control signal based on the deviation amount of the spherical aberration detected by the detection section 410.

Here, the spherical aberration correction control section 401 is shown as one element of the optical disc apparatus 400, but the spherical aberration correction control section 401 acts as a spherical aberration correction control device for controlling the spherical aberration correction section 112 for correcting a spherical aberration even when not included in the optical disc apparatus 400.

Figure 24:
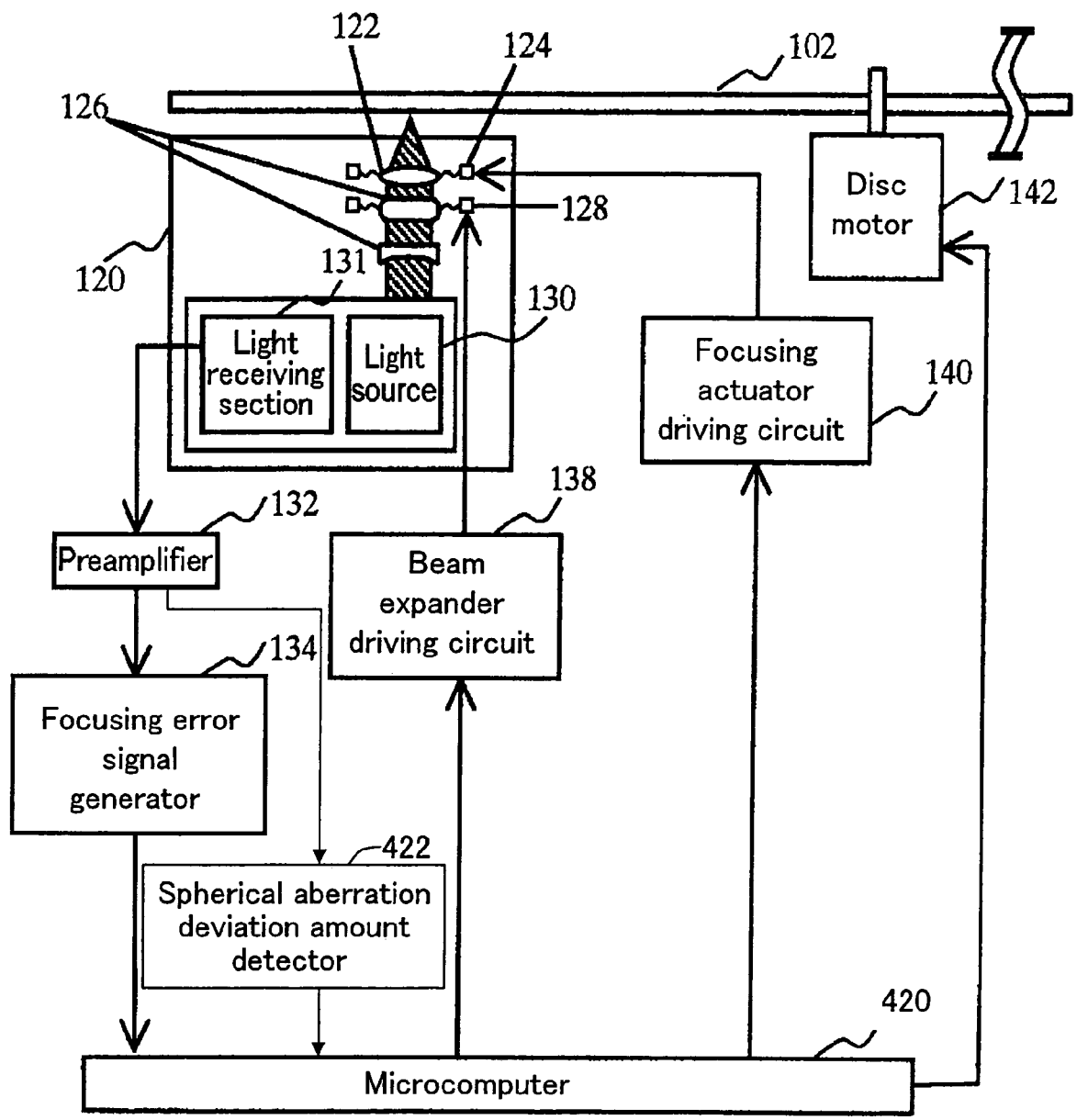
FIG. 24 is a schematic view illustrating an example of a hardware structure of the optical disc apparatus shown in FIG. 23.

FIG. 24 is a schematic view illustrating an example of a hardware structure of the optical disc apparatus 400 shown in FIG. 23.

Identical elements of the optical disc apparatus 400 previously discussed with respect to the optical disc apparatus 100 in FIG. 3 (first example) and the optical disc apparatus 200 in FIG. 16 (second example) bear identical reference numerals and the detailed descriptions thereof will be omitted to avoid redundancy.

The optical disc apparatus 400 includes an optical head device 120, a preamplifier 132, a focusing error signal generator 134, a microcomputer 420, a beam expander driving circuit 138, a focusing actuator driving circuit 140, a disc motor 142, and a spherical aberration deviation amount detector 422.

The spherical aberration deviation amount detector 422 detects a spherical aberration deviation amount based on the signal from the optical disc 102.

The spherical aberration deviation amount detector 422 may include a tracking error signal generator for generating a TE signal to detect the spherical aberration deviation amount based on the TE signal. The spherical aberration deviation amount detector 422 may include a data generator for generating a data signal to detect the spherical aberration deviation amount based on the error rate of the data which has been read from the optical disc 102. The spherical aberration deviation amount detector 422 may include a reproduction signal generator for generating a reproduction signal and a reproduction reference clock generator to detect the spherical aberration deviation amount based on jitter between the reproduction signal and the reproduction reference clock signal.

The spherical aberration deviation amount detector 422 may share at least a part the circuit thereof with the focusing error signal generator 134. The microcomputer 420 has a similar structure and operates in a similar manner to the microcomputer 136 in the first example and the microcomputer 210 in the second example, but is different from the microcomputer 136 and the microcomputer 210 in that the microcomputer 420 receives a signal from the spherical aberration deviation amount detector 422 and calibrates the spherical aberration correction lens driving signal. The spherical aberration deviation amount detector 422 corresponds to the detection section 410 shown in FIG. 23. The microcomputer 420 is an embodiment of the control section 412 shown in FIG. 23.

With reference to FIGS. 25 through 30, an operation of the optical disc apparatus 400 in the third example will be described.

Figure 25:
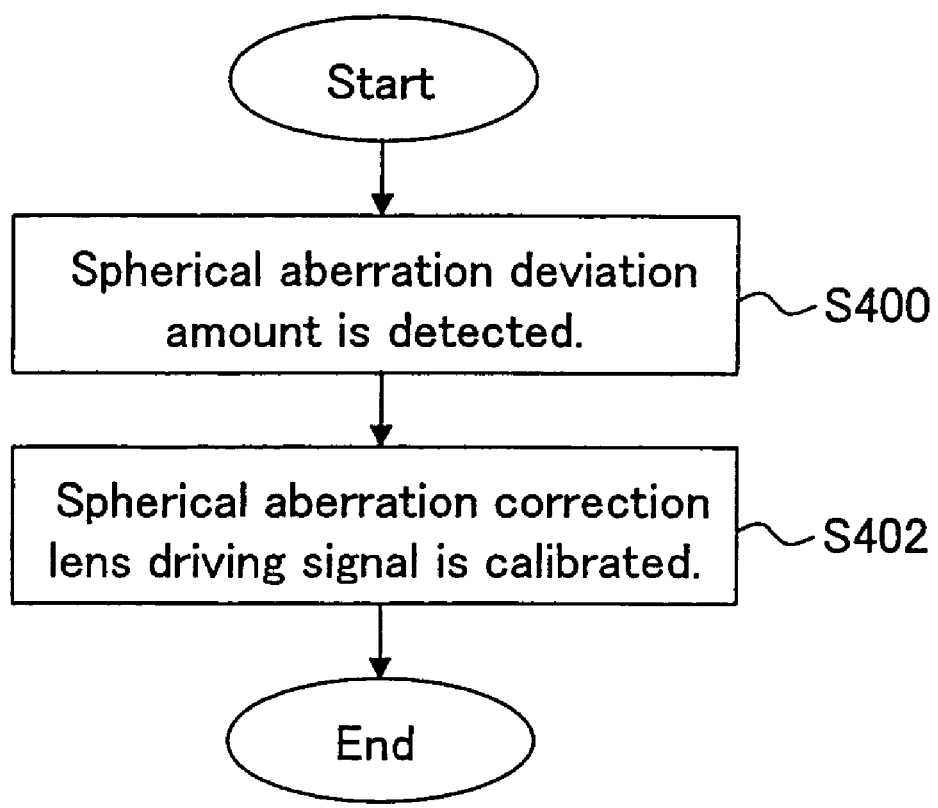
FIG. 25 is a flowchart of an operation for calibrating the correction amount of the spherical aberration according to the third example.

FIG. 25 is a flowchart of an operation for calibrating the correction amount of the spherical aberration according to the third example.

In step S400, the detection section 410 detects a spherical aberration deviation amount.

In step S402, the calibration section 406 calibrates the spherical aberration correction lens driving signal based on the detected deviation amount.

For example, the calibration section 406 calculates an offset for calibrating the spherical aberration correction lens driving signal, and adds the calculated offset to the spherical aberration correction lens driving signal. Thus, even when the correction amount of the spherical aberration deviates due to the weight of the spherical aberration correction lens 126 itself or the like, a proper correction amount can be obtained.

Figure 26:
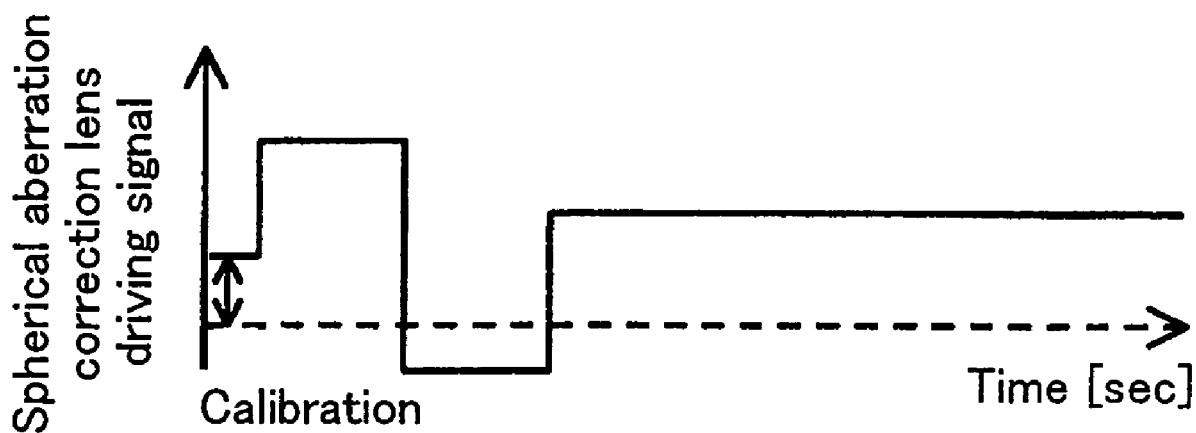
FIG. 26 is a timing diagram illustrating an operation of calibrating the spherical aberration control signal according to the third example.

FIG. 26 is a timing diagram illustrating an operation of calibrating the spherical aberration control signal according to the third example.

FIG. 26 shows a time-wise change in the spherical aberration correction lens driving signal.

Hereinafter, the spherical aberration control signal will be described with reference to FIG. 26.

The spherical aberration correction control section 401 controls the spherical aberration correction section 112 such that the correction amount of the spherical aberration is switched using the spherical aberration correction lens driving signal which has been calibrated as shown in FIG. 26. By such a control, a proper correction amount can be obtained in accordance with the target information face even when the correction amount of the spherical aberration is switched for focusing jump.

Figure 27:
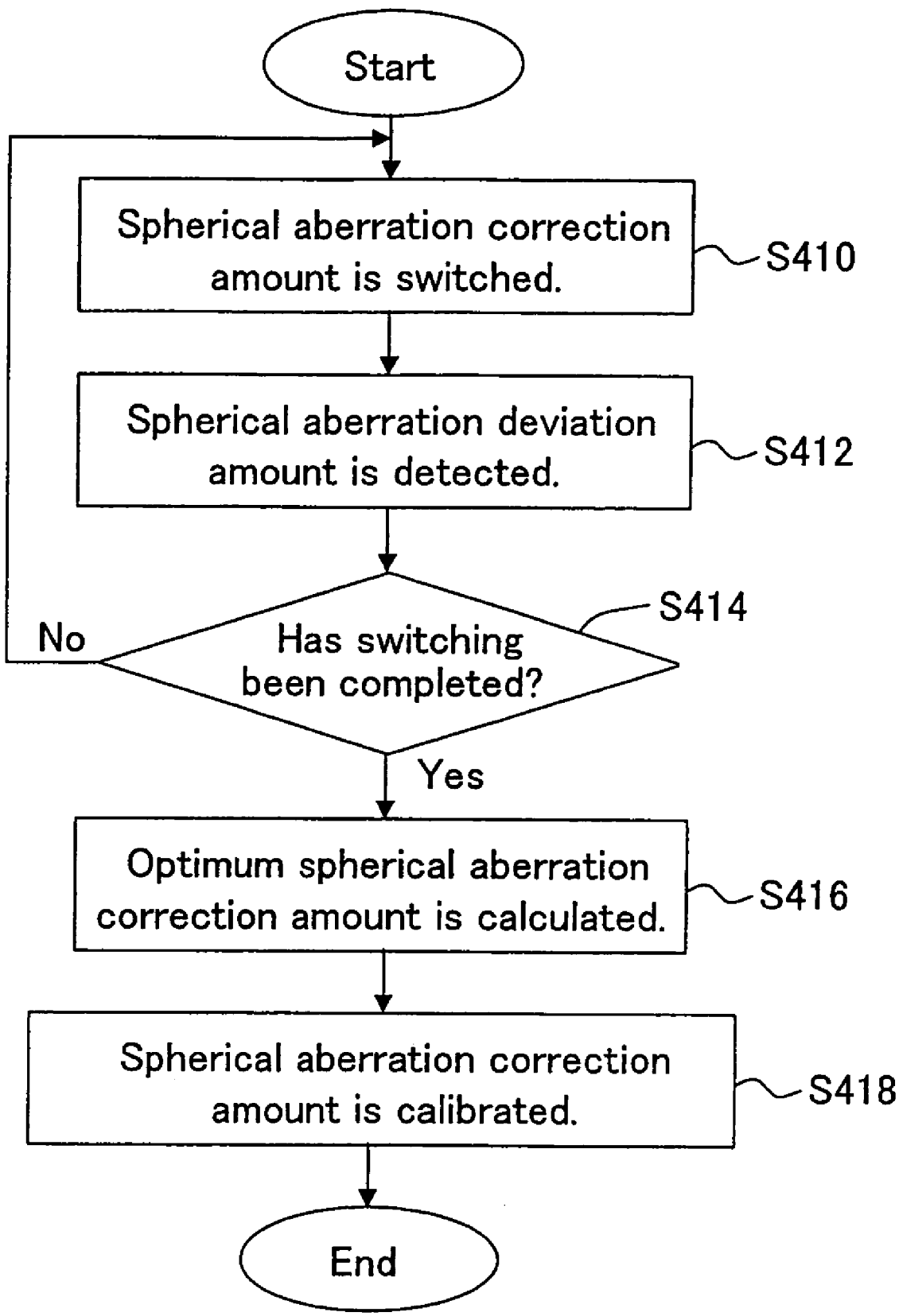
FIG. 27 is a flowchart of an operation for calibrating the correction amount of the spherical aberration according to the third example, while calculating the optimum spherical aberration correction amount.

With reference to FIG. 27, the calibration of the correction amount of the spherical aberration will be described in more detail.

FIG. 27 is a flowchart of an operation for calibrating the correction amount of the spherical aberration according to the third example, while calculating the optimum spherical aberration correction amount.

In step S410, the spherical aberration correction control section 401 switches the correction amount of the spherical aberration to the target correction amount. For example, the spherical aberration correction control section 401 switches the correction amount of the spherical aberration by the method described in the first example or the second example. Thus, the correction amount of the spherical aberration can be quickly switched.

In step S412, the detection section 410 detects a deviation amount of the spherical aberration in the target correction amount.

In step S414, the processing of steps S410 and S412 is repeated a prescribed number of times while the target correction amount is changed. A plurality of target correction amounts are pre-stored, and are sequentially switched.

Next, in step S416, the calibration section 406 calculates an optimum correction amount of the spherical aberration based on the deviation amount corresponding to each of a plurality of target correction amounts detected by the detection section 410. Here, the calibration section 406 may calculate an optimum correction amount using secondary curve approximation or the like.

In step S418, the calibration section 406 calibrates the correction amount of the spherical aberration using the calculated correction amount as the reference value. Namely, the calibration section 406 modifies the spherical aberration correction lens driving signal to a proper value.

Hereinafter, the calculation of the optimum correction amount of the spherical aberration will be described.

First, one technique for calculating the optimum correction amount of the spherical aberration will be described. According to this technique, jitter is detected.

The spherical aberration correction control section 401 sequentially switches the correction amounts of the spherical aberration (BE1 through BE5), and the detection section 410 detects jitters (jitter 1 through jitter 5) corresponding to the respective correction amounts.

Figure 28:
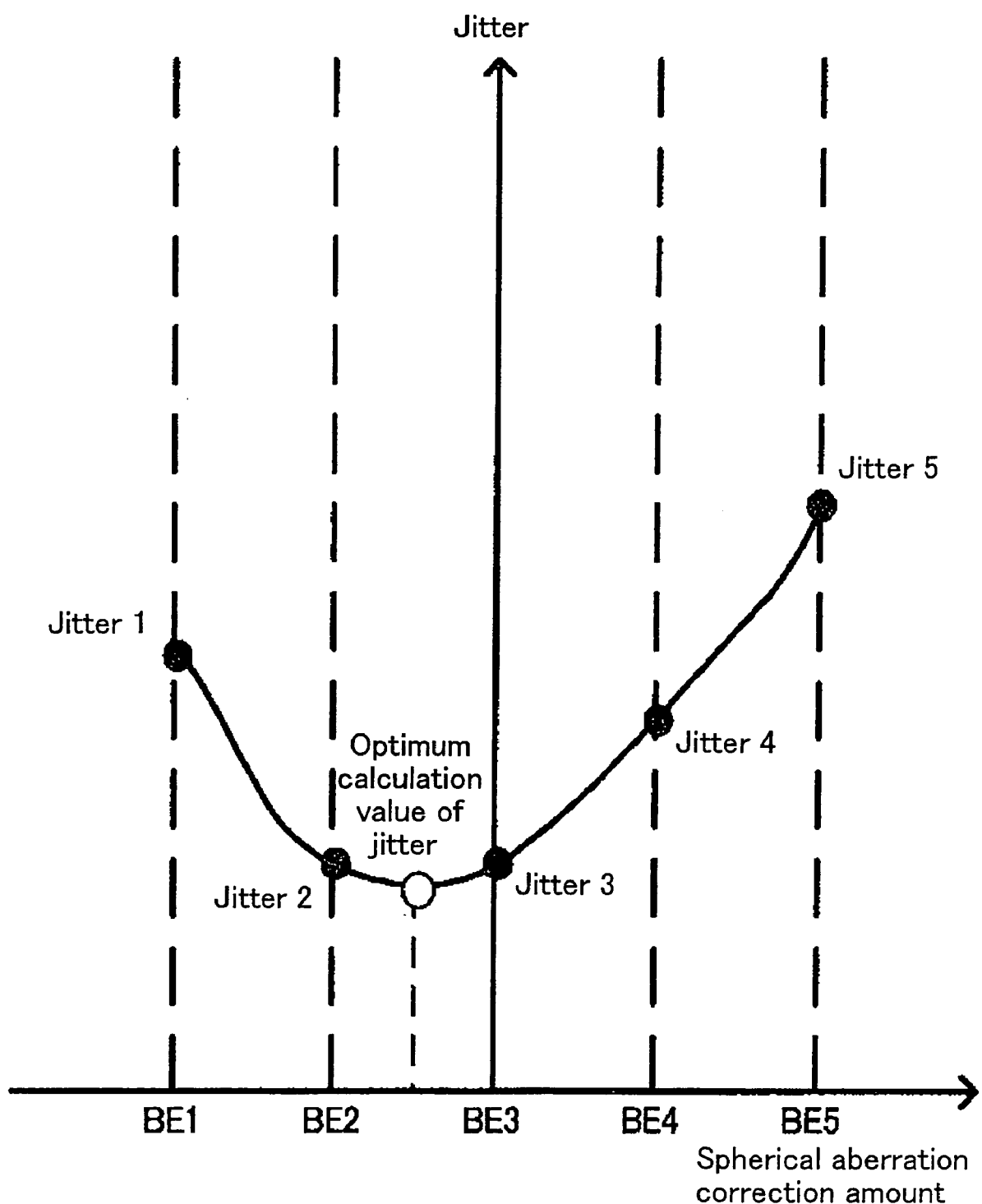
FIG. 28 is a schematic graph illustrating one method of calibration of the correction amount of the spherical aberration according to the third example.

FIG. 28 is a schematic graph illustrating one method of calibration of the correction amount of the spherical aberration according to the third example.

FIG. 28 shows the relationship between the correction amount of the spherical aberration and the jitter.

As shown in FIG. 28, the calibration section 406 performs secondary curve approximation or the like based on each correction amount and detected data (BE1 through BE5 and jitter 1 through jitter 5), and calculates the correction amount at which the jitter has the optimum value.

The calibration section 406 next calibrates the correction amount of the spherical aberration using the calculated correction amount as the reference position. The jitter can be obtained by integrating the deviation amount between the RF signal and the reproduction reference clock signal.

Thus, the correction amount of the spherical aberration can be calibrated using jitter.

Next, another technique for calculating the optimum correction amount of the spherical aberration will be described. According to this technique, a TE amplitude is detected.

When the tracking control is not performed, the spherical aberration correction control section 401 sequentially switches the correction amounts of the spherical aberration (BE1 through BE5), and the detection section 410 detects TE signal amplitudes (TE1 through TE5) corresponding to the respective correction amounts of the spherical aberration.

Figure 29:
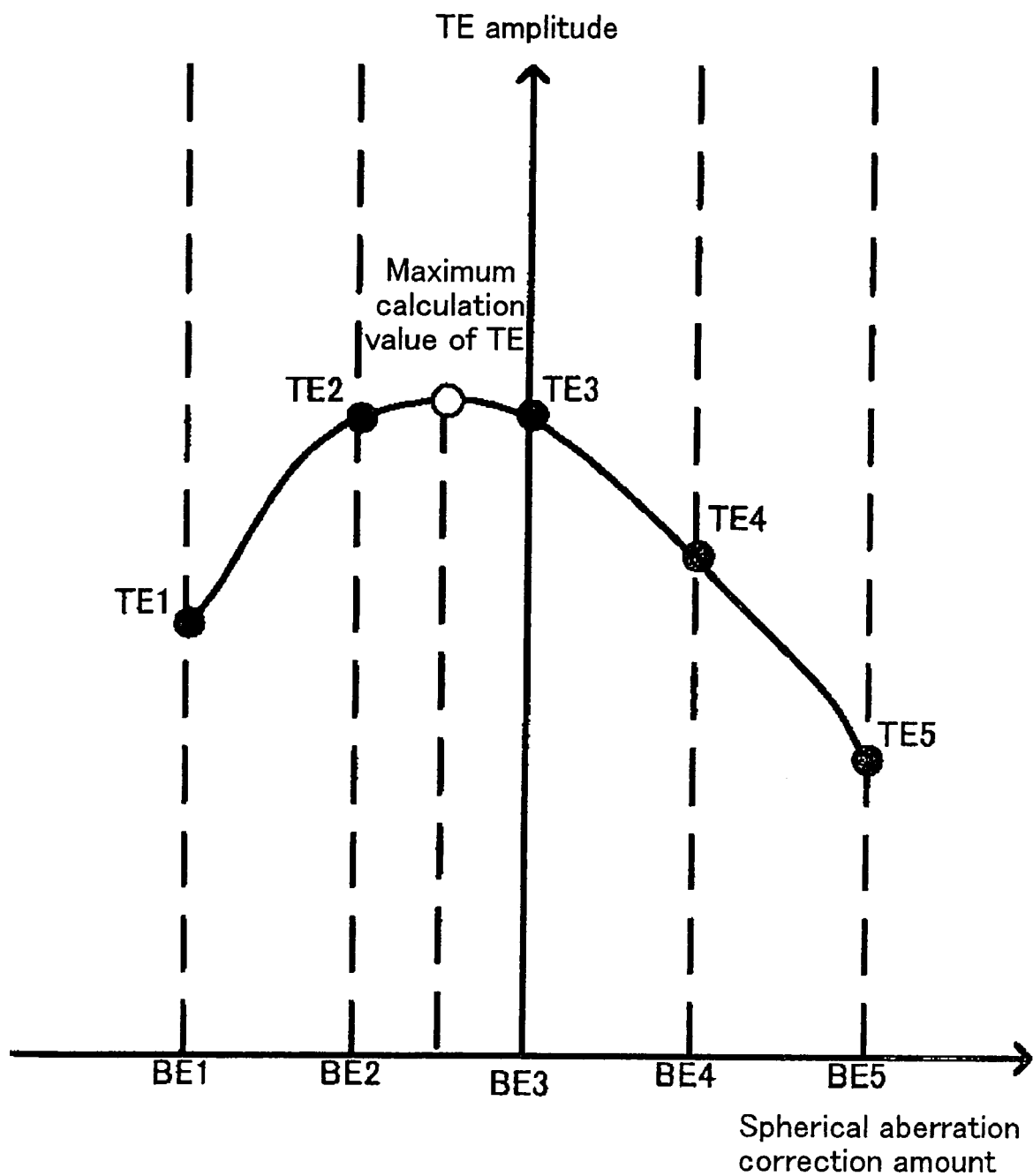
FIG. 29 is a schematic graph illustrating another method of calibration of the correction amount of the spherical aberration according to the third example.

FIG. 29 is a schematic graph illustrating a second method of calibration of the correction amount of the spherical aberration according to the third example.

FIG. 29 shows the relationship between the correction amount of the spherical aberration and the TE amplitude.

As shown in FIG. 29, the calibration section 406 performs secondary curve approximation or the like based on each correction amount and detected data (BE1 through BE5 and TE1 through TE5), and calculates the correction amount at which the TE amplitude has the maximum value.

The calibration section 406 next calibrates the correction amount of the spherical aberration using the calculated correction amount as the reference position.

Thus, the correction amount of the spherical aberration can be calibrated using TE amplitude of a TE signal.

Next, still another technique for calculating the optimum correction amount of the spherical aberration will be described. According to this technique, an error rate is detected.

The spherical aberration correction control section 401 sequentially switches the correction amounts of the spherical aberration (BE1 through BE5), and the detection section 410 detects error rates (error rate 1 through error rate 5) corresponding to the respective correction amounts of the spherical aberration.

Figure 30:
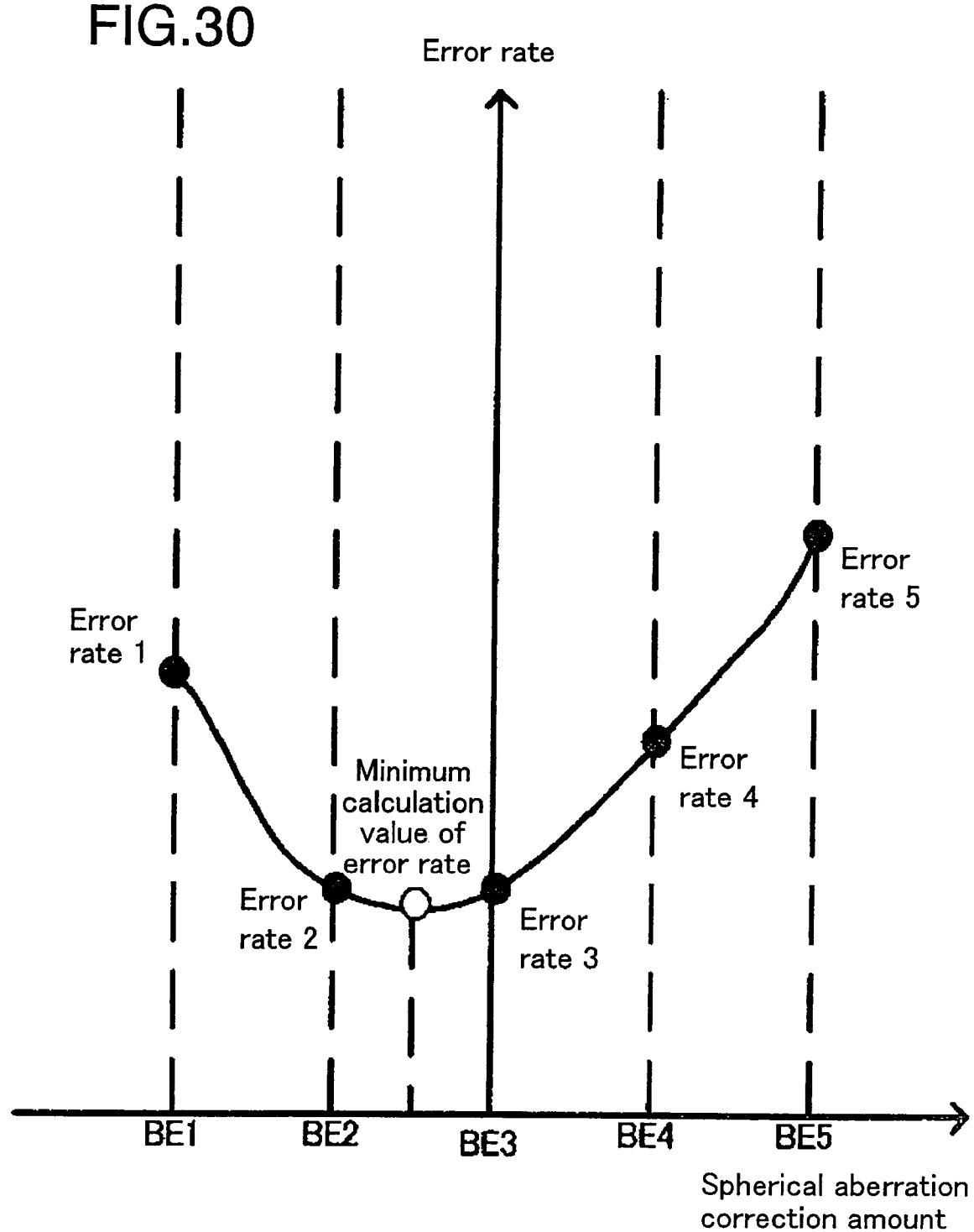
FIG. 30 is a schematic graph illustrating still another method of calibration of the correction amount of the spherical aberration according to the third example.

FIG. 30 is a schematic graph illustrating a third method of calibration of the correction amount of the spherical aberration according to the third example.

FIG. 30 shows the relationship between the correction amount of the spherical aberration and the error rate.

As shown in FIG. 30, the calibration section 406 performs secondary curve approximation or the like based on each correction amount and detected data (BE1 through BE5 and error rate 1 through error rate 5), and calculates the correction amount at which the error rate has the minimum value.

The calibration section 406 next calibrates the correction amount of the spherical aberration using the calculated correction amount as the reference position.

Thus, the correction amount of the spherical aberration can be calibrated using the error rate.

Notably, the error rate has substantially the same correlation with the jitter mentioned above.

It is obvious to those skilled in the art that. the third example can be combined with the first example or the second example.

EXAMPLE 4

In the above-described first through third examples, the optical disc 102 has at least two information faces. The present invention is not limited to this. The present invention is applicable to the case where the optical disc 102 has one information face.

Figure 31:
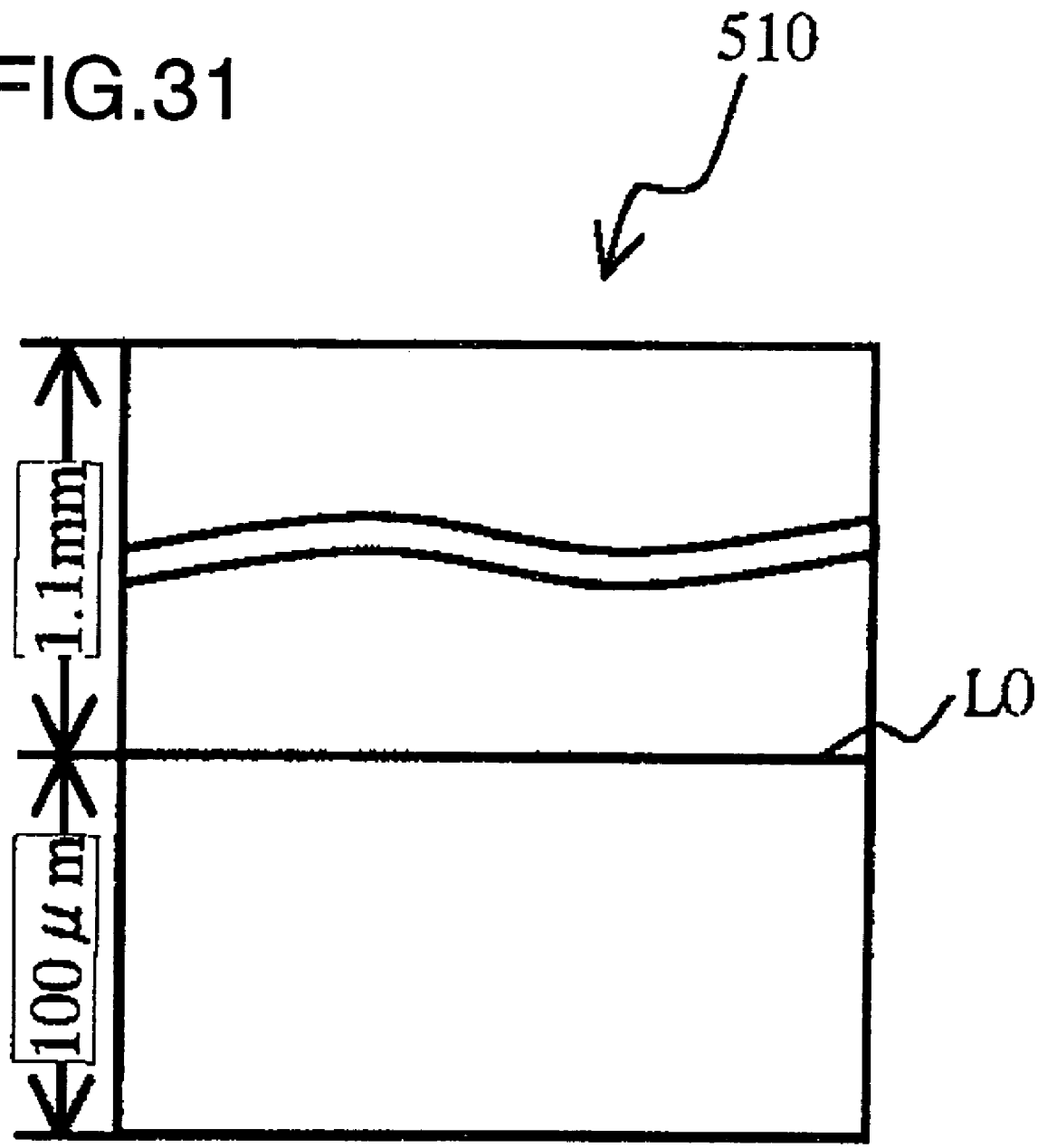
FIG. 31 is a schematic view of an optical disc according to a fourth example of the present invention.

FIG. 31 is a schematic view of an optical disc 510 according to a fourth example of the present invention.

The optical disc 510 has one information face L0.

In the following description, the optical disc 510 having one information face is applied to the third example.

The spherical aberration correction control section 401 may calibrate the correction amount with respect to the information face L0 of the optical disc 510 in accordance with the flowchart shown in FIG. 27.

The information face L0 is located at a position 100±5 μm from the surface of the protective layer.

When the optical system having a numerical aperture of 0.8 or greater (e.g., an optical lens having a numerical aperture of 0.85) is used, the optical disc apparatus preferably has a function of calibrating the spherical aberration even when the optical disc has one information face, from the viewpoint of the precision of the generation of the protective layer of the optical disc.

When the optical disc 510 has one information face, i.e., the optical disc 510 has only the information face L0, focusing jump is not performed. Therefore, the optical disc apparatus 400 shown in FIG. 23 does not need to include the information face movement control section 119.

Although not shown with respect to the first through third examples, the optical disc may have three or more information faces.

The spherical aberration correction control sections 104, 202 and 401 in the first through third examples may switch the spherical aberration control signal in four or more stages.

The spherical aberration correction control sections 104 and 401 may switch the spherical aberration control signal with a pulse width which is equal to one cycle of the primary resonance of the spherical aberration correction section 112. For example, the spherical aberration correction control sections 104 and 401 each first apply a pulse having a width equal to one cycle of the primary resonance of the spherical aberration correction section 112, then apply a pulse of the opposite polarity having a width equal to one cycle of the primary resonance of the spherical aberration correction section 112, and then switch the spherical aberration control signal so as to obtain the target correction amount.

In the third example, a stepping motor or the like is usable as means for moving the spherical aberration correction lens.

Figure 32:
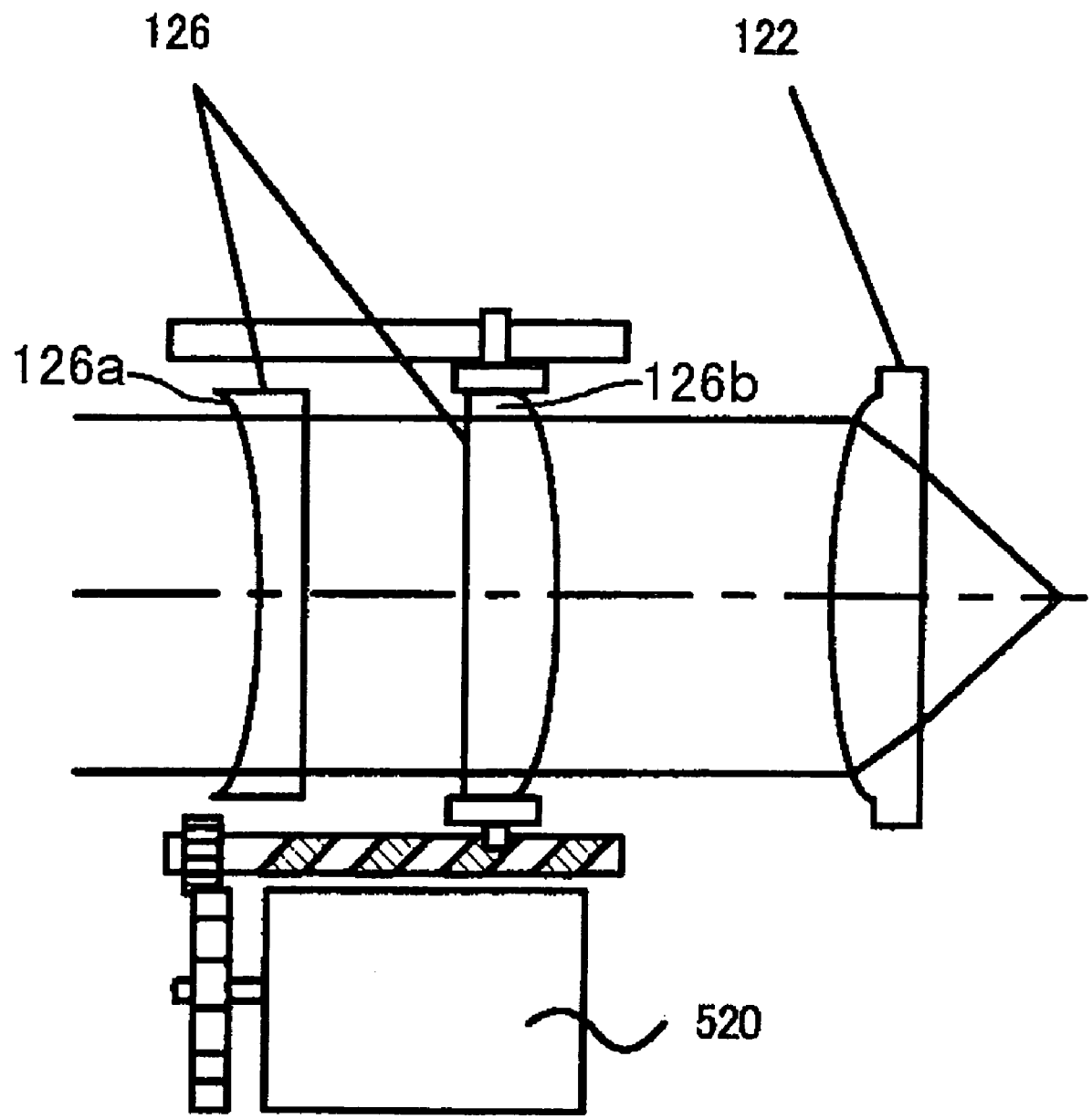
FIG. 32 is a schematic view of a stepping motor according to the present invention.
Figure 33:
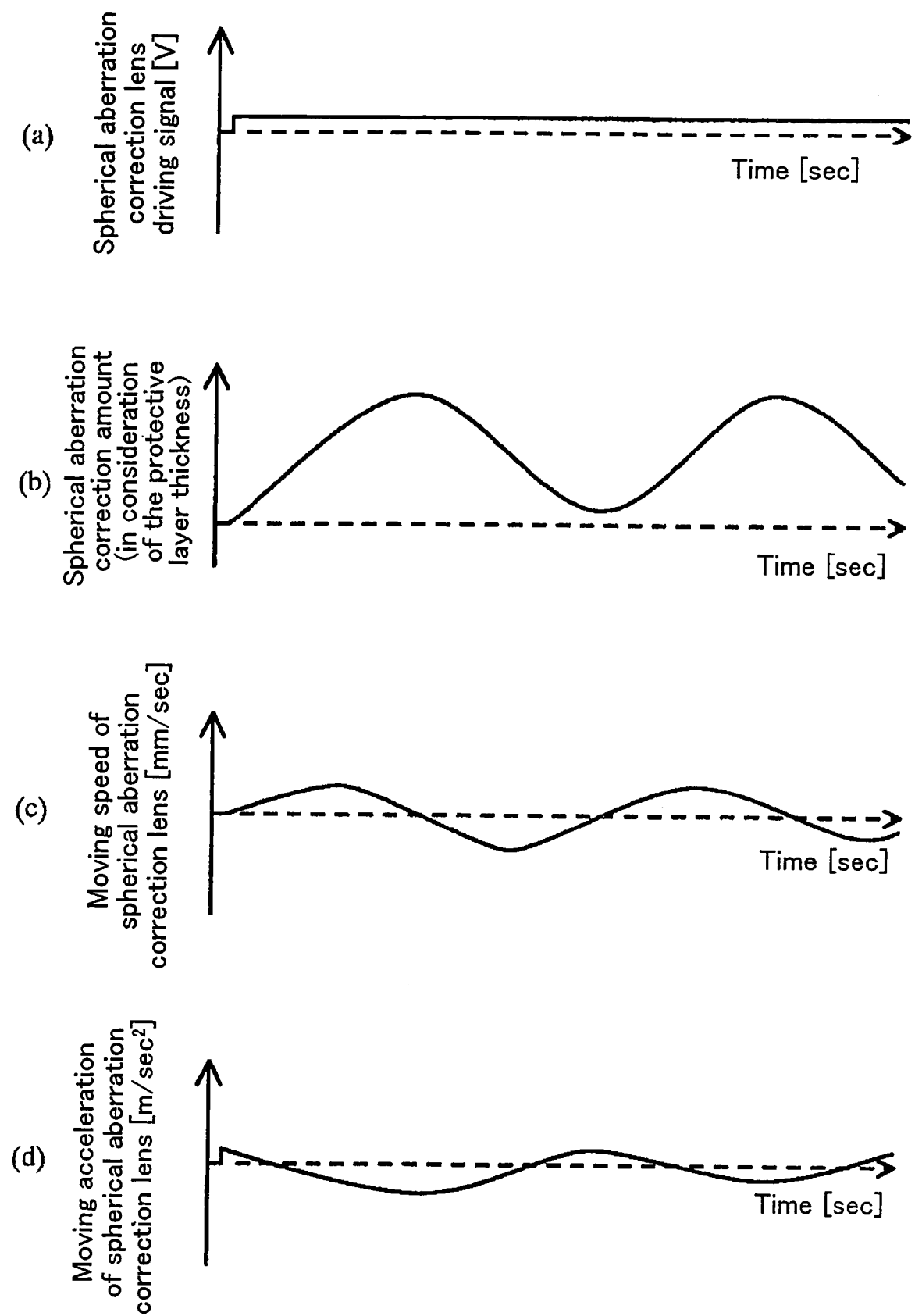
FIG. 33 is a timing diagram illustrating a conventional operation for switching the correction amount of the spherical aberration.

FIG. 32 is a schematic view of a stepping motor 520 according to the present invention.

The concave lens member 126*a* and/or the convex lens member 126*b* is moved using the stepping motor 520 as shown in FIG. 32. Thus, the distance between the concave lens member 126*a* and the convex lens member 126*b* can be changed.

The control sections 117, 201, and 412 in the first through third examples may be embodied by executing a program by a processor (not shown) which has read the program from a computer readable recording medium (not shown) such as, for example, a ROM or a RAM. Namely, the control sections 117, 201, and 412 may be implemented by software or firmware. The control sections 117, 201, and 412 may be partially or entirely implemented by hardware. The detection section 410 in the third example may also be implemented by software or firmware, or partially or entirely implemented by hardware.

According to the present invention, a spherical aberration control signal is generated such that the sum of correction amounts corresponding to components of the spherical aberration control signal becomes substantially zero with respect to the target correction amount, and the spherical aberration control signal thus generated is used to control the spherical aberration correction section. In this manner, the spherical aberration can be quickly corrected without the correction amount of the spherical aberration being fluctuating.

According to the present invention, the spherical aberration control signal is calibrated based on the deviation amount of the spherical aberration. Thus, the spherical aberration can be properly corrected.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A spherical aberration correction control device for controlling a spherical aberration correction section for correcting a spherical aberration of an optical beam irradiating an optical disc, the spherical aberration correction control device comprising:

a spherical aberration control signal generation section for generating a spherical aberration control signal; and an output section for outputting the spherical aberration control signal to the spherical aberration correction section;

wherein:

a correction amount by which the spherical aberration is corrected is changed by the spherical aberration correction section in accordance with components of the spherical aberration control signal; and the spherical aberration control signal generation section generates the spherical aberration control signal such that a sum of correction amounts corresponding to the respective components of the spherical aberration control signal becomes substantially zero with respect to a target correction amount.

2. A spherical aberration correction control device according to claim 1, wherein the spherical aberration control signal generation section switches the spherical aberration control signal in at least two stages.

3. A spherical aberration correction control device according to claim 2, further comprising a parameter receiving section for receiving a parameter for switching the spherical aberration control signal,
wherein the spherical aberration control signal generation section switches the spherical aberration control signal based on the parameter.

4. A spherical aberration correction control device according to claim 1, further comprising:
a receiving section for receiving a deviation amount of the spherical aberration; and
a calibration section for calibrating the spherical aberration control signal based on the deviation amount of the spherical aberration received by the receiving section, before the output section outputs the spherical aberration control signal to the spherical aberration correction section.

5. A spherical aberration correction control device according to claim 2, wherein the spherical aberration control signal generation section switches the spherical aberration control signal in a pulsed manner.

6. A spherical aberration correction control device according to claim 5, wherein the spherical aberration control signal generation section switches the spherical aberration control signal with a pulse width which is sufficiently shorter than a cycle of primary resonance of the spherical aberration correction section.

7. A spherical aberration correction control device according to claim 2, wherein:
the spherical aberration correction section includes a spherical aberration correction lens for switching the correction amount by moving in accordance with the spherical aberration control signal; and
the spherical aberration control signal generation section switches the spherical aberration control signal so as to move the spherical aberration correction lens in acceleration from a position of the spherical aberration correction lens corresponding to the correction amount before the spherical aberration control signal is switched toward a position of the spherical aberration correction lens corresponding to the target correction amount, then switches the spherical aberration control signal so as to move the accelerated spherical aberration correction lens in deceleration, and then switches the spherical aberration control signal so as to correspond to the target correction amount.

8. A spherical aberration correction control device according to claim 7, wherein:
the spherical aberration control signal generation section switches the spherical aberration control signal so as to fulfill:

$a1 \cdot t1 + a2 \cdot t2 = 0 (t1 \leq T, t2 \leq T)$;

and $L = |a1 \cdot t1 \cdot t1|/2 + |a2 \cdot t2 \cdot t2|/2$ where:
T is a cycle of primary resonance of the spherical aberration correction lens;
a1 is an amount of change in an amplitude of the spherical aberration control signal corresponding to an average value of the acceleration when the spherical aberration correction lens is accelerated;
a2 is an amount of change in an amplitude of the spherical aberration control signal corresponding to an average value of the acceleration when the spherical aberration correction lens is decelerated;
t1 is an accelerating time of the spherical aberration correction lens;
t2 is a decelerating time of the spherical aberration correction lens; and
L is an amount of movement of the spherical aberration correction lens from the position of the spherical aberration correction lens corresponding to the correction amount before the correction amount is switched to the position of the spherical aberration correction lens corresponding to the target correction amount.

9. A spherical aberration correction control device according to claim 2, wherein the spherical aberration control signal generation section performs first step switching of switching the spherical aberration control signal in a stepped manner so as to correspond to a prescribed correction amount between the correction amount before the spherical aberration control signal is switched and the target correction amount, and then performs second step switching of switching the spherical aberration control signal in a stepped manner so as to correspond to the target correction amount.

10. A spherical aberration correction control device according to claim 9, wherein the spherical aberration control signal generation section sets the prescribed correction amount such that a maximum value of the correction amount in the first step switching is the target correction amount.

11. A spherical aberration correction control device according to claim 9, wherein:
the spherical aberration correction section includes a spherical aberration correction lens for switching the correction amount by moving in accordance with the spherical aberration control signal; and
the spherical aberration control signal generation section switches the spherical aberration control signal so as to fulfill:

$A = (L/K1)/(1 + \exp(-\omega n \cdot \zeta \cdot t1)/\sqrt{1-\zeta \cdot \zeta})$ $B = L/K1$ $t1 = (3\pi/2 - \mathrm{atn}(\sqrt{1-\zeta}/\zeta)/(\omega n \cdot \sqrt{1\zeta \cdot \zeta}))$ where:
A is an amount of change in an amplitude of the spherical aberration control signal between the spherical aberration control signal before the first step switching and the spherical aberration control signal after the first step switching;
B is an amount of change in an amplitude of the spherical aberration control signal between the spherical aberration control signal before the first step switching and the spherical aberration control signal after the second step switching;
t1 is a time period from the first step switching to the second step switching;
L is an amount of movement of the spherical aberration correction lens from a position of the spherical aberration correction lens corresponding to the correction amount before the first step switching to a position of the spherical aberration correction lens corresponding to the target correction amount;
$\zeta$ is an attenuation coefficient of the spherical aberration correction lens ($\zeta < 1$);

ωn is a primary resonance angular frequency of the spherical aberration correction lens;

K1 is a sensitivity of the spherical aberration correction section;

exp( ) is an operation symbol of an index having Napier's number as the base;

sqrt( ) is an operation symbol of square root; and atn( ) is an operation symbol of arc tangent.

12. An optical disc apparatus, comprising:
a spherical aberration correction section for correcting a spherical aberration of an optical beam irradiating an optical disc; and
a spherical aberration correction control section for controlling the spherical aberration correction section,
wherein:
the spherical aberration correction control section includes:
a spherical aberration control signal generation section for generating a spherical aberration control signal; and
an output section for outputting the spherical aberration control signal to the spherical aberration correction section;
wherein:
a correction amount by which the spherical aberration is corrected is changed by the spherical aberration correction section in accordance with components of the spherical aberration control signal; and
the spherical aberration control signal generation section generates the spherical aberration control signal such that a sum of correction amounts corresponding to the respective components of the spherical aberration control signal becomes substantially zero with respect to a target correction amount.

13. An optical disc apparatus according to claim 12, wherein the spherical aberration control signal generation section switches the spherical aberration control signal in at least two stages.

14. An optical disc apparatus according to claim 13, further comprising a parameter receiving section for receiving a parameter for switching the spherical aberration control signal,
wherein the spherical aberration control signal generation section switches the spherical aberration control signal based on the parameter.

15. An optical disc apparatus according to claim 12, wherein:
the optical disc has at least one information face;
the at least one information face includes a first information face; and
the optical disc apparatus further includes:
a convergence section for converging the optical beam to the first information face;
a vertical moving section for moving the converging section in a direction substantially perpendicular to the first information face;
a focusing error detection section for detecting a convergence state of the optical beam converged to the first information face; and
a focusing control section for controlling the vertical moving section so as to converge the optical beam to the first information face based on the convergence state of the optical beam detected by the focusing error detection section.

16. An optical disc apparatus according to claim 15, wherein:
the at least one information face further includes a second information face;

the optical disc apparatus further includes an information face movement control section for controlling the vertical moving section such that the optical beam converged on the first information face moves to the second information face; and
the spherical aberration correction control section controls the spherical aberration correction section so as to switch the correction amount to a correction amount corresponding to the second information face.

17. An optical disc apparatus according to claim 12, wherein the spherical aberration control signal generation section further includes:
a receiving section for receiving a deviation amount of the spherical aberration; and
a calibration section for calibrating the spherical aberration control signal based on the deviation amount of the spherical aberration received by the receiving section, before the output section outputs the spherical aberration control signal to the spherical aberration correction section.

18. An optical disc apparatus according to claim 13, wherein the spherical aberration control signal generation section switches the spherical aberration control signal in a pulsed manner.

19. An optical disc apparatus according to claim 18, wherein the spherical aberration control signal generation section switches the spherical aberration control signal with a pulse width which is sufficiently shorter than a cycle of primary resonance of the spherical aberration correction section.

20. An optical disc apparatus according to claim 13, wherein:
the spherical aberration correction section includes a spherical aberration correction lens for switching the correction amount by moving in accordance with the spherical aberration control signal; and
the spherical aberration control signal generation section switches the spherical aberration control signal so as to move the spherical aberration correction lens in acceleration from a position of the spherical aberration correction lens corresponding to the correction amount before the spherical aberration control signal is switched toward a position of the spherical aberration correction lens corresponding to the target correction amount, then switches the spherical aberration control signal so as to move the accelerated spherical aberration correction lens in deceleration, and then switches the spherical aberration control signal so as to correspond to the target correction amount.

21. An optical disc apparatus according to claim 20, wherein the spherical aberration control signal generation section switches the spherical aberration control signal so as to fulfill:

$$a1 \cdot t1 + a2 \cdot t2 = 0 (t1 \leq T, t2 \leq T);$$

and $$L = |a1 \cdot t1 \cdot t1|/2 + |a2 \cdot t2 \cdot t2|/2$$

where:
T is a cycle of primary resonance of the spherical aberration correction lens;
a1 is an amount of change in an amplitude of the spherical aberration control signal corresponding to an average value of the acceleration when the spherical aberration correction lens is accelerated;

a2 is an amount of change in an amplitude of the spherical aberration control signal corresponding to an average value of the acceleration when the spherical aberration correction lens is decelerated;

t1 is an accelerating time of the spherical aberration correction lens;

t2 is a decelerating time of the spherical aberration correction lens; and

L is an amount of movement of the spherical aberration correction lens from the position of the spherical aberration correction lens corresponding to the correction amount before the correction amount is switched to the position of the spherical aberration correction lens corresponding to the target correction amount.

22. An optical disc apparatus according to claim 13, wherein the spherical aberration control signal generation section performs first step switching of switching the spherical aberration control signal in a stepped manner so as to correspond to a prescribed correction amount between the correction amount before the spherical aberration control signal is switched and the target correction amount, and then performs second step switching of switching the spherical aberration control signal in a stepped manner so as to correspond to the target correction amount.

23. An optical disc apparatus according to claim 22, wherein the spherical aberration control signal generation section sets the prescribed correction amount such that a maximum value of the correction amount in the first step switching is the target correction amount.

24. An optical disc apparatus according to claim 22, wherein:

the spherical aberration correction section includes a spherical aberration correction lens for switching the correction amount by moving in accordance with the spherical aberration control signal; and the spherical aberration control signal generation section switches the spherical aberration control signal so as to fulfill:

$$A = (L/K1)/(1+\exp(-\omega n \cdot \zeta \cdot t1)/\sqrt{1-\zeta \cdot \zeta})$$

$$B = L/K1$$

$$t1 = (3\pi/2 - \mathrm{atn}(\sqrt{1-\zeta \cdot \zeta}/\zeta))/(\omega n \cdot \sqrt{1-\zeta \cdot \zeta})$$

where:

A is an amount of change in an amplitude of the spherical aberration control signal between the spherical aberration control signal before the first step switching and the spherical aberration control signal after the first step switching;

B is an amount of change in an amplitude of the spherical aberration control signal between the spherical aberration control signal before the first step switching and the spherical aberration control signal after the second step switching;

t1 is a time period from the first step switching to the second step switching;

L is an amount of movement of the spherical aberration correction lens from a position of the spherical aberration correction lens corresponding to the correction amount before the first step switching to a position of the spherical aberration correction lens corresponding to the target correction amount;

$\zeta$ is an attenuation coefficient of the spherical aberration correction lens ($\zeta < 1$);

$\omega n$ is a primary resonance angular frequency of the spherical aberration correction lens;

K1 is a sensitivity of the spherical aberration correction section;

exp( ) is an operation symbol of an index having Napier's number as the base;

sqrt( ) is an operation symbol of square root; and atn( ) is an operation symbol of arc tangent.

* * * * *

UNITED STATES PATENT AND TRADEMARK OFFICE
CERTIFICATE OF CORRECTION

PATENT NO. : 7,239,595 B2  Page 1 of 1
APPLICATION NO. : 10/752810
DATED : July 3, 2007
INVENTOR(S) : Yuuichi Kuze, Katsuya Watanabe and Kenji Fujiune It is certified that error appears in the above-identified patent and that said Letters Patent is hereby corrected as shown below:

Column 32, Claim 11
line 42, "A = (L/K1)/(1 + exp(-ωn·ζ·t1)/sqrt(1 - ζ·ζ)"
should read -- A = (L/K1)/(1 + exp(-ωn·ζ·t1)/sqrt(1 - ζ·ζ)) -- line 45, "t1 = (3π/2 - atn(sqrt(1 - ζ)/ζ)/(ωn·sqrt(1 ζ·ζ))"
should read -- t1 = (3π/2 - atn(sqrt(1 - ζ)/ζ)/(ωn·sqrt(1 - ζ·ζ)) --

Signed and Sealed this

Twenty-fifth Day of December, 2007

JON W. DUDAS
*Director of the United States Patent and Trademark Office*